United States Patent [19]

Baxter et al.

[11] 4,270,043

[45] May 26, 1981

[54] METHODS OF AND APPARATUS FOR TIME CLOCK RECORDING AND COMPUTATION AND RELATED USES

[75] Inventors: Larry K. Baxter, Lexington, Mass.; Robert D. Cohen, Belle Harbor, N.Y.; Mark S. Ain, Newton; Sheldon P. Apsell, Nahant, both of Mass.

[73] Assignee: Kronos Inc., Brighton, Mass.

[21] Appl. No.: 20,223

[22] Filed: Mar. 13, 1979

[51] Int. Cl.[3] .......................... G06C 15/00; G06F 3/08; G06K 7/10; G06F 15/12

[52] U.S. Cl. .......................... 235/419; 235/377; 235/432; 235/455; 235/487; 346/86

[58] Field of Search .............. 235/377, 419, 423, 432, 235/455, 487; 346/82, 86

[56] References Cited

U.S. PATENT DOCUMENTS

| | | | |
|---|---|---|---|
| 2,735,617 | 2/1956 | Kuntsen | 235/487 |
| 3,109,088 | 10/1963 | Lyner | 235/432 |
| 3,284,929 | 11/1966 | Azure, Jr. | 35/48 |
| 3,350,545 | 10/1967 | Street | 235/454 |
| 3,365,714 | 1/1968 | Timares et al. | 235/454 |
| 3,639,732 | 2/1972 | Crain et al. | 235/487 |
| 3,805,026 | 4/1974 | Anders | 235/487 |
| 3,894,215 | 7/1975 | Lotter et al. | 235/377 |
| 4,011,434 | 3/1977 | Hockler | 235/377 |

OTHER PUBLICATIONS

Cincinnati Time Recorder Co., Model 75, Bulletin D-554-S.

Computer Hardware, Inc., "The Chi Clok System", (including brochures on the 4250 System, The 4210 System, and the 4120 Cassette Formatter) and the The Chi 4111 Clok", (Bulletin Chi 4111B2773).

Simplex Time Recorder Co., "Simplex Scan-Card Recorder", Bulletin 308 9-69 10M.

Costal Data Systems, Inc., "The Smart Clock", brochure.

Epic Data Corp. "The Epic Data System", Bulletin ED-5 (10-76).

Datron Systems, Inc., Model 401, Bulletin 04A, and "Datron Systems, Inc. Announces a Time Clock and Keypunch Combined, Model 401", brochure.

Stromberg Products, Model 3600, Bulletin F-900.

Interflex, Inc., "Interflex 256 Electronic Time Computer", (1975).

Systematics, Inc., "Plantime System-Arc, brochures.

Panasonic Co., "'M' Line Data Collection System" and Data Action Tracker, brochures, including Bulletins DCG 1026 0377, DCG 1045 0577, DCG 1022 0377, DCG 1043 0577, and DCG 1046 0677.

Incoterm Corp., "Incomate 301", brochure.

Rusco Electronic Systems, "Cardentry-A Security Access Control System," Form No. RES 500/5-76 and Cardentry System 500, Pub 11017, 14 May 1976.

Amano Corporation, "Arecodata 1070 System", brochure.

Xanadu Controls, "Up-Timer", Catalog No. 178T, Bulletin 17820 MX.

*Primary Examiner*—Daryl W. Cook

*Attorney, Agent, or Firm*—Rines and Rines, Shapiro and Shapiro

[57] ABSTRACT

This disclosure is concerned with time-clock recording and computation that, through a novel clock track card and separate clock track and data channel optical reading, in cooperation with microprocessor calculation, storage and control, enables automating employee time and attendance and similar data in a format directly recordable on the card and also directly useable by payroll or other processing computers and the like.

56 Claims, 17 Drawing Figures

CONTROL LOGIC

METHODS OF AND APPARATUS FOR TIME CLOCK RECORDING AND COMPUTATION AND RELATED USES

The present invention relates to method of and apparatus for time-clock recording and computation purposes and the like, such as in connection with employee's time cards and related uses, being more particularly concerned with the automating of employee time and attendance and similar systems, and in a manner and format readily and directly recordable on the time cards and directly useable by payroll processing or other computer equipment or the like.

While the invention will hereinafter be described with particular reference to the preferred application to the problem of automating the process of recording employee work hours, it will be understood that this is illustrative of an important usage of the invention which is also adaptable, as hereinafter discussed, to other uses wherein similar needs are involved. Current recording of employee or related attendance is still most generally accomplished manually by means of mechanical clocks that stamp the beginning and ending times upon the employee's time card. The computation of elapsed time is then also effected manually, usually by a supervisor. This computation may be fairly complex, taking into account various company policies for early arrivals, late arrivals, overtime, sick time, holiday time, vacation time, and other factors. Companies that use computers for preparation of payrolls must then keypunch this information onto tabulating cards, magnetic tape, or disks, so that the information is in a form useable by the computer.

Several approaches to the problem of automating such a process have been made with varying degrees of improvement. Among these proposals have been systems assigning each employee a magnetic or punched badge which can be read electronically. There are, however, several disadvantages to such an approach. These include the concern of the employee that his or her record might be altered or erroneously treated without a permanent written record such as a time card; state laws and union agreements, moreover, often requiring the specific use of time cards. Apart from the problem of overcoming the inertia involved in changing from a widely used technique to a relatively new and unproven technique, furthermore, there is the difficulty involved in instantly generating new badges for new employees or to replace or accommodate for lost badges, shift changes, job accounting changes, etc., with the attendant high cost of the badges in situations where employee turnover is high or job accounting information frequently changes.

Among prior machines for attempting to improve the technique, are the Model 75 Badge Reader and Model 80 Optical Scanner of the Cincinnati Time Recorder Co., described in their bulletin D-554-5. This device reads an employee badge and then prints the time information in OCR format onto fanfold paper tape which is stored in the device. The information is also printed for employee verification purposes on adding machine-like roll paper which can be viewed through a window as the employee is punching in and out. This record, however, cannot be retained by the employee and, indeed, is not even in a record form convenient for employee retention. At the end of the pay period, the paper tape must be removed from the time clock and applied to another machine for optically scanning the paper tape and converting the data to magnetic tape for input to a computer. Such an approach falls short of an adequate solution to the above-described problem, however, in several particulars. First, it lacks a record for use by employees. Secondly, it requires replenishment of the machine with paper tape and involves the physical transport of the data to the computer, as distinguished from direct transmission of data. The necessity for a separate optical scanner makes the overall system expensive for small users, and the underlying technique does not enable the rapid generating of new badges and still necessitates the use of mechanical time clocks and standard time cards as a backup system.

A similar apparatus is marketed by Computer Hardware, Inc., of Sacramento, Calif., as described in its bulletin "The CHI 4111 Clock", CHI 4111B2773. Though conceptually similar to the Cincinnati Model 75, the CHI equipment uses a magnetic tape cassette instead of the paper tape. It still requires the use of a second device to put the data into a form directly readable by the computer, and, again, without the ability to transmit the data directly to the computer.

Another similar approach is that of Simplex Time Recorder Co. of Gardner, Mass. Its "Scan-Card Recorder", as described in its bulletin 3089-69, employs a specifically prepared time card and prints on the card in an OCR-readable font. At the end of the pay period, the cards are read into an optical character reader to convert the data to magnetic tape, which must then again be transported to the payroll computer.

An improvement upon the above machine concepts is described in "The Smart Clock" bulletin of Coastal Data Services, Inc. of Miami, Fla. The system uses a badge for employee identification, but provides no written record for use by the employee. This product does, however, store the time and attendance data in solid state memory until the memory is interrogated by the payroll processing computer. It also has a keyboard for entering special information. Although this is a microprocessor-based product, on the other hand, it does not have software tailored specifically for such applications as payroll pre-processing. A similar system is also marketed by Epic Data Corporation of Bellevue, Wash., as described in its bulletin ED-5 (10-76).

Other prior equipments read a tabulating card that has been pre-punched with the employee ID information, and then punch the time information onto the card. At the end of the pay period, these cards are used for input to the computer. Among such equipments are those described in the Datron System, Inc. (New Jersey) bulletin 04A, Model 401; and the Stromberg Products (Connecticut) bulletin F-900, Model 3600. A third category of prior equipment provided for these useages, involves a complete stand-alone payroll system. Such a system consists of terminals which must be continuously on-line to a computer, either supplied by the manufacturer as part of the system, or supplied by the customer to be used with these on-line terminals. Among such equipments are those described in the bulletins of Interflex Inc. (New York), Interflex 256 (1975), and Systematics, Inc. (New Jersey), Plantime System ARC. Examples of terminals suitable for use with general purpose minicomputers are those described in the bulletins of Panasonic Company (New Jersey), Data Action Tracker (DC 10260377), and Incoterm Corporation (Massachusetts), Incomate 301.

There are also prior systems similar to the above that, however, were designed primarily for security applications, but offer time and attendance data collection as a secondary feature, such as that described in the bulletin of Rusco Electronic Systems (California), Cardentry System 500 (PUB 110017, May, 14, 1976).

Still another system [Amano Corp. (Japan), Bulletin Aredocata 1070] reads employee information from a card and then prints the time on the card. This is accomplished by using a time card that has the employee identified by punches in the bottom of the card. The time and attendance terminals are connected to a paper punch machine which does the data collection. This tape is then read into the main payroll processing computer which then sorts the data for payroll preparation. Since the card reader terminals have no intelligence of their own, they do not compute and print on the card the total hours worked by each employee.

Examples of prior patents involving features above-described and related prior techniques are U.S. Pat. Nos. 3,639,732; 3,365,714; 3,350,545; 3,284,929; and 2,735,617; but no one of these, nor any combination of the same, provides a solution to the above-stated problems.

Prior devices only solve a part of the overall problem of automating payroll preparation, as above discussed. The features required to accomplish the entire job, and admirably embodied in the present invention, include reading employee identification and job-accounting information directly from a time card; preparing such time card quickly and inexpensively; printing date, time in, time out, and total pay hours on the time card; computing total hours for which the employee is to be paid, taking into account various company policies for early arrivals, late arrivals, overtime, sick time, holiday time, vacation time, etc.; enabling entering parameters necessary for such computing without the need for custom programming at the factory; enabling alteration of existing data or entering additional data; storaging data within the time clock; formatting the data into a standardized clock; and transmitting data directly to the payroll processing computer or the like, upon interrogation.

In accordance with the invention, moreover, there is no need for resort to prepared materials or magnetic or punched plastic or other badges, with their attendant previously described limitations. To the contrary, a simple cardboard or similar card is employable which can be readily marked with any sort of marking device, be it pencil, pen, or other marker that can produce a mark on a piece of paper, thus enabling any office immediately to prepare these cards. The time clock system of the invention has the ability to read and interpret these markings and without concern for the density of the marks as in prior mark-sense systems (such as prior density-sensitive card readers, including that of Xanadu Division of Valcor Engineering Corporation, New Jersey, Bulletin 17820Mx, "Up-Timer"). The present invention, indeed, provides a novel mark-sense reader that is self-calibrating and enables simple marking and a universal algorithm approach for all conditions of calculation that obviates the necessity for high cost software.

A primary object of the invention, accordingly, is to provide a new and improved method of and apparatus for time clock recording and computation and for automating payroll preparation and the like, that shall not be subject to the above-described disadvantages and/or limitations or inadequacies of prior systems, but that, rather, provide a complete solution for the problem of automating payroll preparation with all, not just part, of the features tabulated in the preceding paragraph.

A further object is to provide a novel recording and calculation apparatus of more general applicability, as well; including novel sub-combination features, such as novel self-calibrating mark-sensing, particularly useful in the apparatus of the invention and in other areas, as well; and novel time clock cards and detect apparatus.

An additional object is to provide such a novel method and apparatus that enable continual updated employee time, attendance and similar information, readily printable upon the employee time card and accessible for direct internal or external communication.

Other and further objects will be explained hereinafter and are more particularly delineated in the appended claims.

In summary, from one of its important applications, the invention embraces a method of time clock recording for use with a time and other data card provided with information identifying the user and space for recording additional data, that comprises, electronically storing identification, time and other data of users; electronically reading the identifying information on a user's card at times of check-in and check-out; withdrawing from such electronic storage in response to such reading, data associated with the user to identify the same; electronically totaling time periods between times of check-in and check-out to maintain stored data as to summary time periods for the user; and recording such summary time period data upon the said space of the card at check-out. Other inventive features and preferred constructional details are hereinafter described.

The invention will now be described with reference to the accompanying drawings, FIGS. 1A, B, and C of which are front, top and side elevational views of an apparatus constructed in accordance with a preferred form of the invention;

Figure 6A:
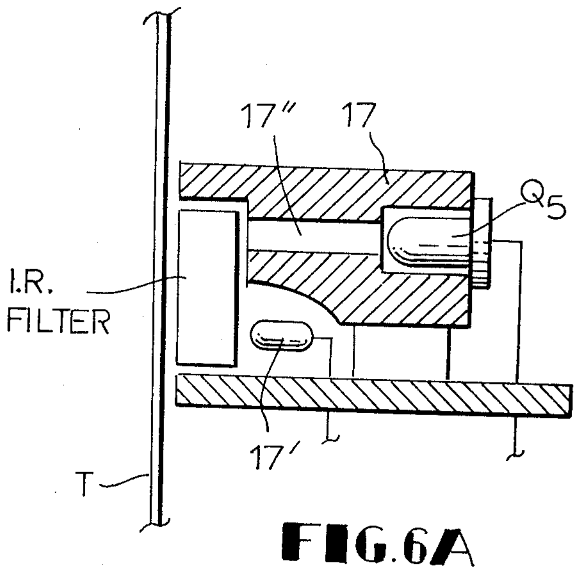
Figure 6C:
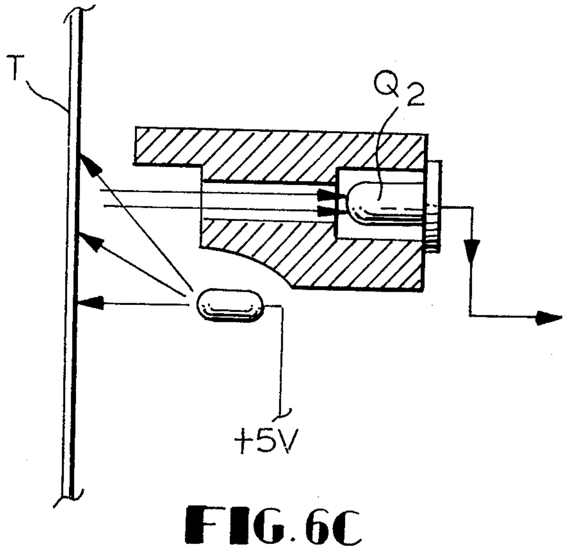
Figure 6B:
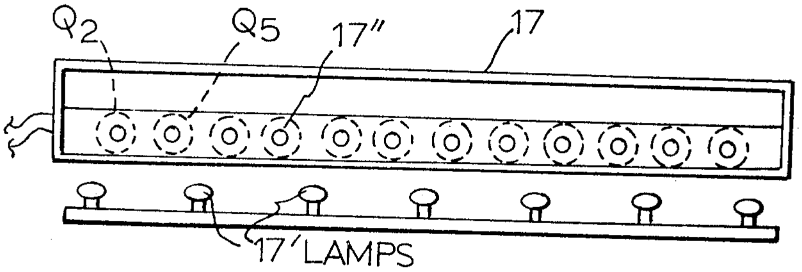
Figure 7:
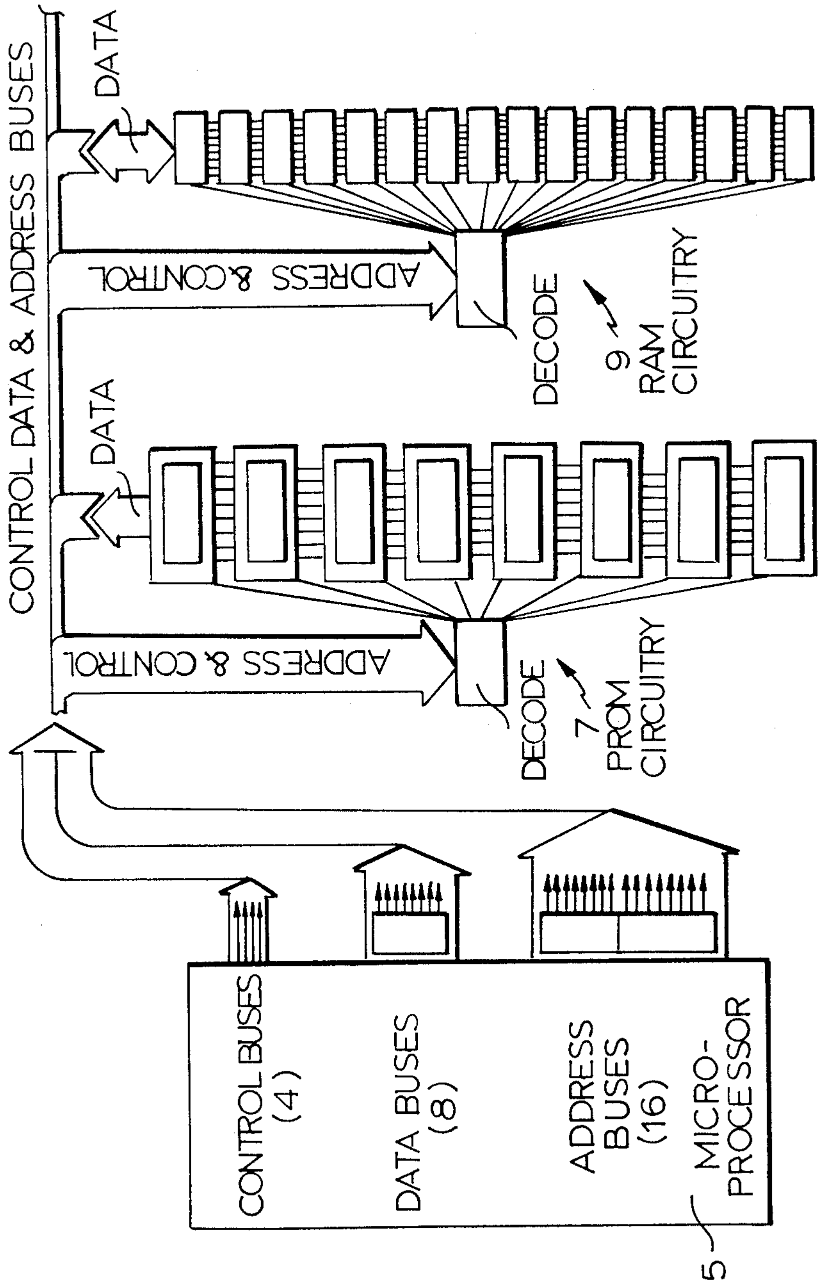
Figure 8:
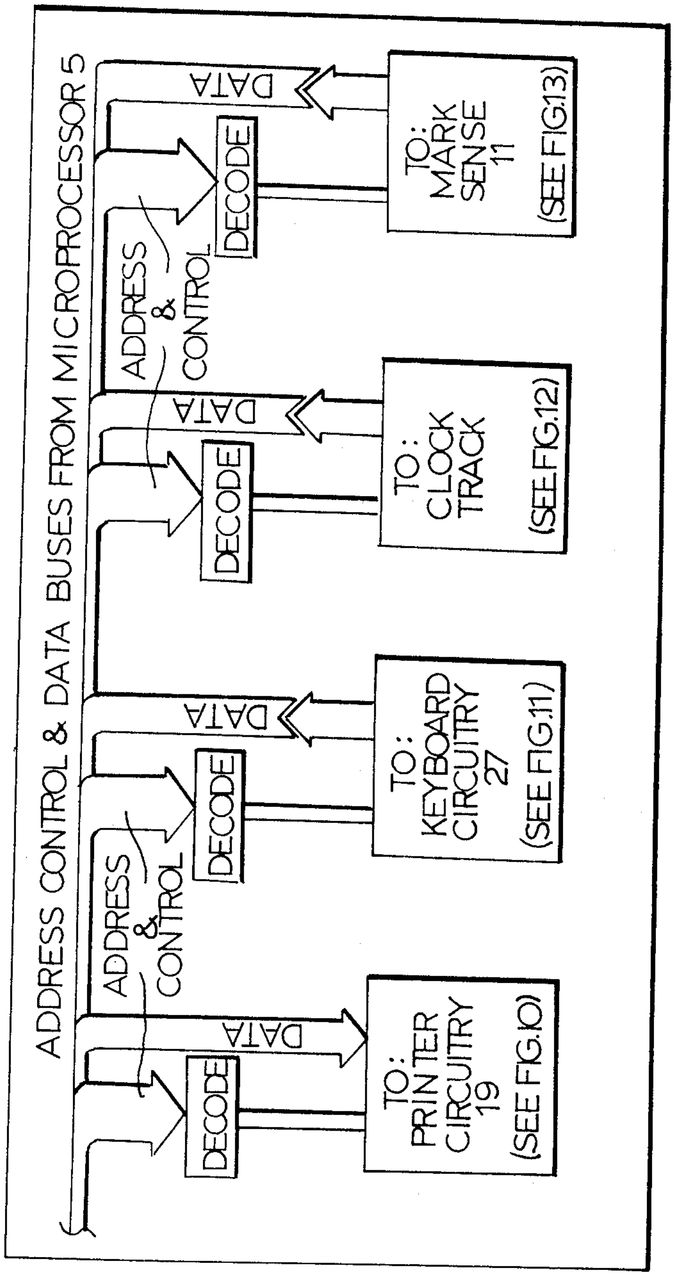
Figure 9:
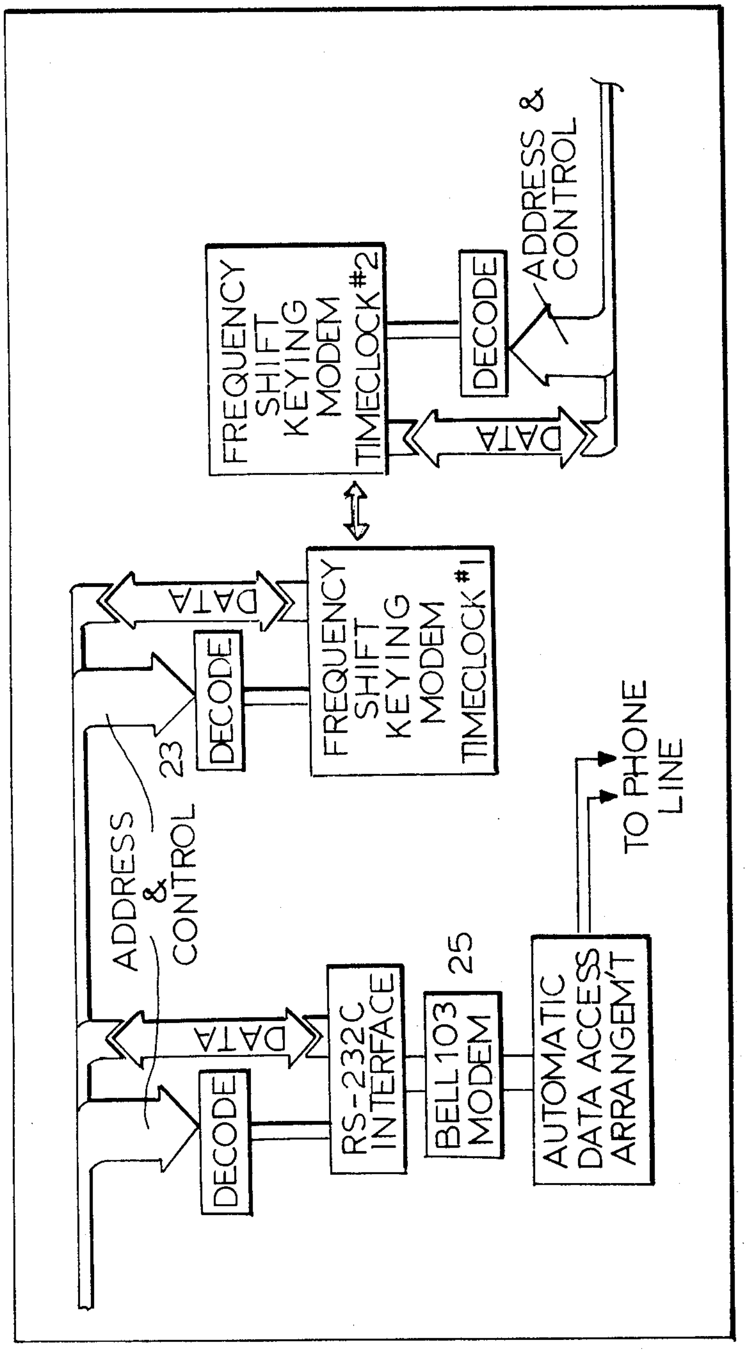

FIGS. 6A and C are sectional views, and FIG. 6B is a front elevation of optical sensing blocks employed in the apparatus;

FIGS. 7, 8 and 9 are successive block and schematic circuit connection diagrams of the system of the above-mentioned figures; and FIGS. 10, 11, 12 and 13 are respectively schematic circuit diagrams of preferred electronic circuits for the printer, keyboard, clock-track and mark-sense detector systems for use in the system of the other figures.

GENERAL APPARATUS LAY-OUT

Figure 1B:
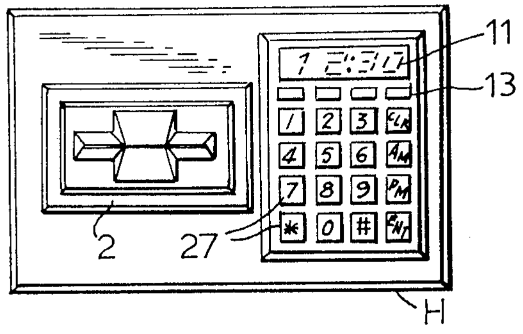
Figure 1A:
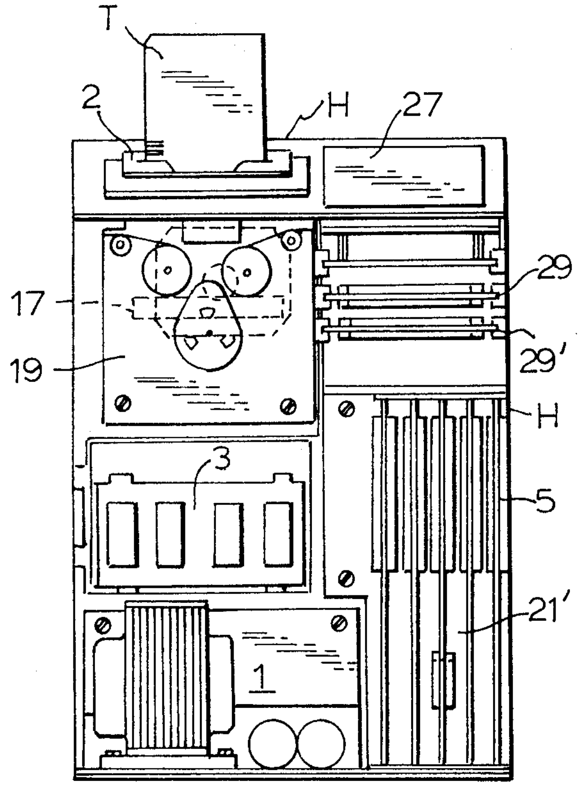
Figure 1C:
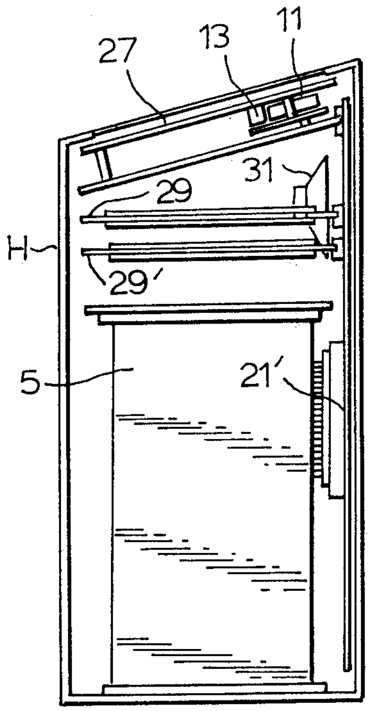

Turning, first, to the overall system, FIGS. 1A and 1C are front and side views, respectively, of a preferred apparatus console or housing H with panels removed to expose the interior, and FIG. 1B illustrates a top view. A time card is shown at T inserted within a top surface slot and card assembly guide 2, past a photosensitive transistor sensor block or similar reading line or sensor array 17, more fully discussed in connection with FIGS. 6A and B, and cooperative with a mark-sense electronic circuit later also delineated in detail. The card T is shown extending into a printer region 19 comprising a print character drum cooperative with opposing solenoid-controlled impact hammer means later described, and with the lower end of the card operated upon by a card clamping or grabbing solenoid. A power supply 1 and standby battery source 3 for keeping up the random access memory for the system may conveniently be disposed on one side at the lower levels of the console H, with the microcomputer circuit boards 5 mounted along the other side of the console.

A digital time display 11, shown as of the LED type, is provided on the top panel, FIGS. 1B and 1C, with abnormal or malfunction or status lamp or bulb indicators, also preferably LED or similar devices 13, therebelow, and with a top panel keyboard 27 there-provided as well. The later-described electronic boards 29, 29' for the optics, printing and keyboard and display, and the loud speaker 31 for audio response when the keyboard is operated or when an indication of improper operation is to be signalled, may be mounted within the upper section of the console H below the top panel. The side view of FIG. 1C also shows the mother-board construction 21' containing all the interconnections from the various printed circuit boards 5 that plug into the same. While the display 11 and malfunction indicator bulbs 13 are physically mounted so that they are externally visible at the top of the unit, and the keyboard 27 is also shown at the same location, the keyboard need not be located on an external surface of the console. As a further example, the keyboard 27 may be disposed within the console, accessible through a door or panel to prevent undesired use or abuse; or the same may be internally disposed as a movable sub-assembly connected to its electronics via a flexible cable, so that the operator can open up the console and access the keyboard to enter whatever information is desired and then may reinsert it back into the console.

GENERAL OPERATIONAL DESCRIPTION

Figure 2:
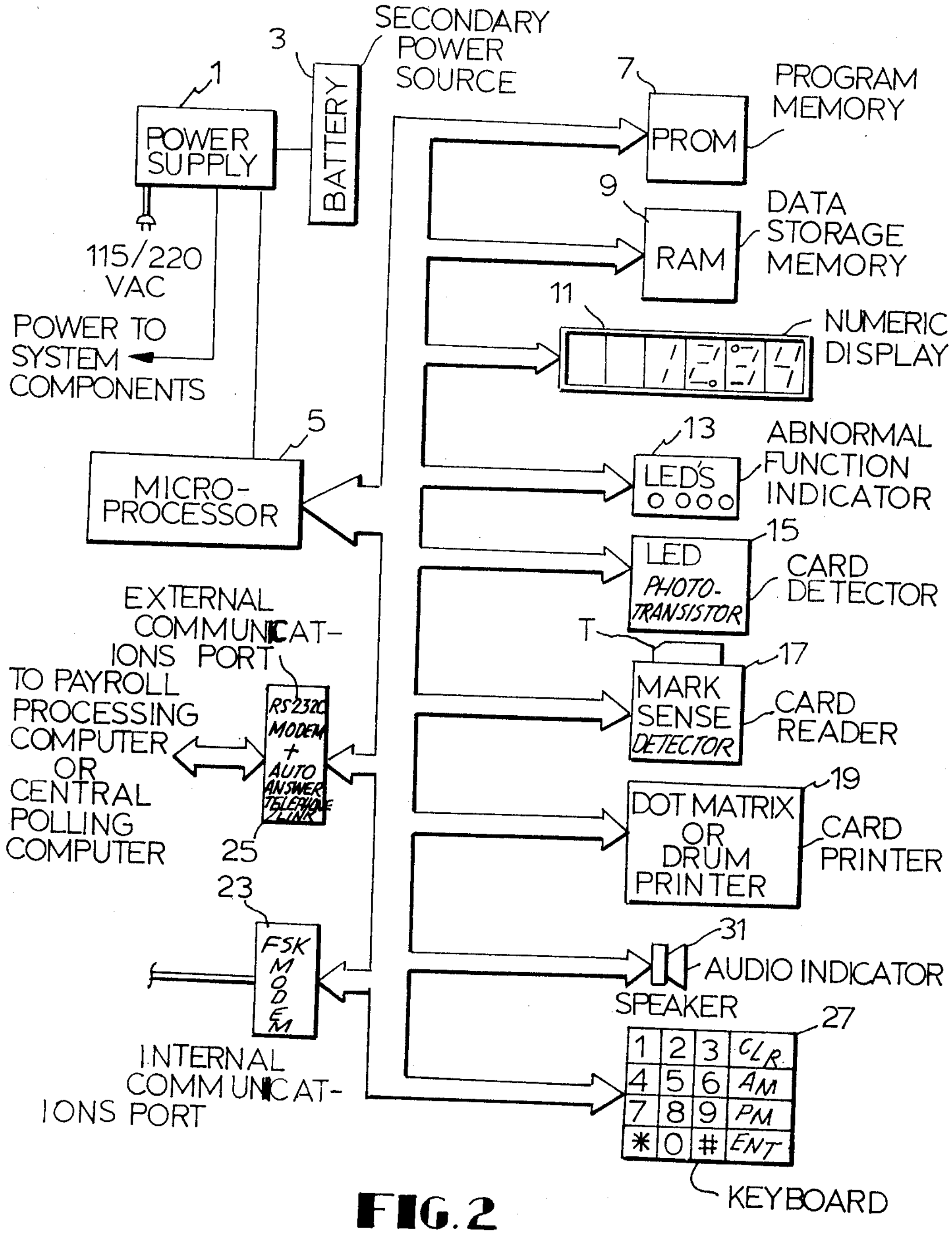
FIG. 2 is a block diagram of the components of the apparatus of FIGS. 1A–C and their operational interrelation.

So much for the overall mechanical layout of the preferred apparatus of the invention. Before proceeding to describe details of the physical construction and operation, it is believed to be conducive to clarity, first to describe in block diagrammatic form the general overall operation of the system. Referring, therefore, to FIG. 2, the before-described power supply 1 may receive ac voltage available in the office, such as 115 or 220 volts, generating the necessary ac and dc voltages and currents needed by the various parts of the device. Should the primary power source be interrupted, the previously mentioned back-up battery 3, which normally is not in use and is just being charged from the primary source, will serve to keep operational certain key parts of the device; namely, the microprocessor 5 and the random access memory. A suitable microprocessor for the purposes of the invention is, for example, the Z80, as described in the February, 1977 Mostek Corporation Z80 Technical Manual. Other parts of the device, such as the printer 19 and display 11 are not powered from this emergency source because it is presumed that the device will not be used in normal mode at such time; but it is vital to keep memory from being lost, and specifically the random access memory.

Two kinds of memory are herein used with the microprocessor 5; first, a program memory 7 (PROM), and also the before-mentioned random access dynamic memory 9 (RAM). In the program memory 7, the firm ware is stored; that is, a control logic executed by the microprocessor 5 to generate the appropriate command sequences such as are required to read the card T, print on the card, process the keyboard 27, etc. In the data storage memory 9, on the other hand, the information obtained from reading the time cards T or information obtained from initializing the time clock with, for example, the parameters of when a person can enter and leave and like data, is stored. All the data stored at 9 is held for use in, for example, a larger payroll processing computer elsewhere, with this information transmittable by phone-line to either a central holding computer or to a payroll processing computer by means of external communications, as through the modem 25.

The previously mentioned numeric display 11 is used to indicate the time of the day, and to give a feed-back to the operator, for example, when it is being initialized and the operator is entering the date or the time in this numeric display. A 6-digit LED type display is shown for illustrative purposes.

The four malfunction lights 13 may be incandescent bulbs or LED indicators or the like to indicate some abnormal operation of the clock such as, for example, that the card is not read properly, or that a person is putting in a time card T which indicates that such person should not be punching in at this time, or that something has gone wrong in the clock that requires servicing.

A card detector 15 is provided, which detects the time card T as it is being inserted into the time clock guide 2. This card detector can be of one of two types. It can be a photo-transistor and LED or similar combination connected for transmission of light to the phototransistor; or it can be of the reflective type wherein the insertion of a card causes this light to be reflected from the source into the photo-transistor where otherwise it would not be so reflected. In either case, the detector 15 alerts the electronics to the fact that a card is entering or that a card is still in the machine; and it will so indicate that state until the card is removed.

In accordance with the invention, the time card T consists of various components, later more fully discussed, including a longitudinal margin set of clock track marks 2' (FIG. 3) used for determining the position of the card relative to the printer 19 and in particular to the line to be printed. There is also a central lower clock-track 2'' in the data field 6 which indicates the number of the row being read. The data field 6 is the area where information is mark-sensed on the card. The print area 10 (FIG. 3) is the upper area on the card T upon which the information that is outputted from the time-clock to the person using the card is printed.

In the block system of FIG. 2, the time card T is shown exposed to the mark-sense detector 17 that actually reads the information in the data field 6 of the card T and converts the same into a form useable by standard microprocessors 5. The printer 19, particularly designed for printing on cards, may be of various types such as a drum printer or a matrix-printer.

While a loud speaker 31 has been before described for giving an audio indication of improper operation, or to alert the operator that something is unusual or requires attention, such indication need not be given by a loud speaker. Other warning devices, piezoelectric resonators, etc., may also be used.

Turning, now to the keyboard 27, this keyboard enters information in initializing the clock, including setting up the correct time and date, the pay period endings and the like. It is also used at other times by a supervisor or operator to input specific commands to the clock, such as changing or entering something which would not normally be permitted, or requesting a summary of information in the clock. It is also used by maintenance personnel in requesting tests of various specific functions of the components inside the clock. For example, maintenance personnel could use the keyboard to turn the printer on and off to make sure that it is working. They could use the keyboard to request that a specific line of print be printed on a card, or to request a check of memory by having the computer write a known thing into and out of each address, or to check out the whole operation by speeding up the time, say ten times or one hundred times faster than normally, so that the maintenance personnel can check that the algorithms are being executed in the expected manner.

There are basically two kinds of communications, external and internal, useful with the system of the invention. The external communication has been previously mentioned in connection with the modem 25 to enable the clock to transmit its data to a payroll processing computer or some central holding computer. The external communications port may, for example, consist of a RS232C interface, modem, and data access arrangement that will automatically answer the telephone when it rings in order to establish a two-way telephone communication.

Internal communications is illustrated at 23, wherein the internal communications port comprises a frequency-shift keyer (FSK) to provide tones which represent the digital signals, enabling one clock to communicate with another clock. This has at least three principal functions. First, it is often necessary in multi-clock installations to synchronize the time in all the clocks; secondly, this would enable a person punching in on one clock to punch out on another clock that does not have information as to that person, but could obtain the same by inter-clock communications. A third use of this would be in support of the external communications port as a cluster-controller to prevent more that one clock from answering the telephone at once or try to communicate simultaneously over a single telephone line.

THE TIME CARD

Figure 3:
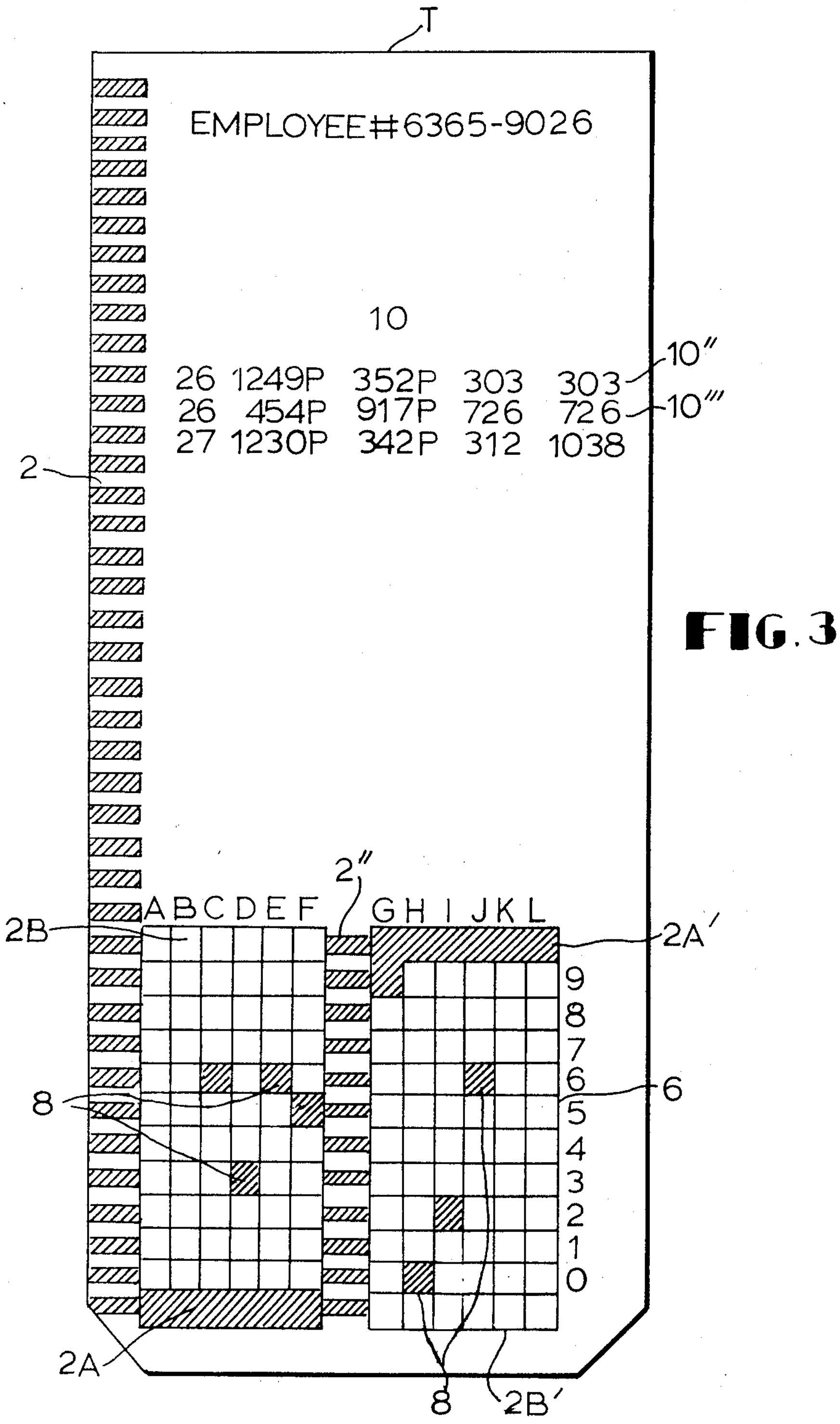
FIG. 3 is a drawing of the preferred novel calibrated time card useful with the invention.

It is now in order more fully to describe the novel time card T of the invention with particular reference to FIG. 3. As before stated, the time card uses longitudinal margin track marks 2′, shown on the left edge although the opposite edge could also be used. The clock-track 2′ enables determination of the position of the card relative to the print line adjacent the particular clock-track mark 2′. The parallel marks are preferably equally spaced as illustrated. The interior or central similar clock-track 2″ preferably divides the two halves of the data field 6, increasing by two the amount of skew which the card can tolerate and still be able to read accurately the inserted data such as the pencilled blocks 8 in the data field 6.

The remaining component of the card T is the area 10 on which the information is printed, as shown at printed lines 10″, 10‴, etc.

While the cards of the invention can be used for various purposes, principal purpose is the recording of the employee's coming and going, and displaying the amount of time for which the employee will be paid, both so far that day, and so far that week. A typical line of print 10″, for example, may consist of the following: the date, for example, the 26th day of the month; the time at which the employee punched in, for example, 12:49 pm; the time at which the employee punched out, for example, 3:52 pm; the total number of hours credited with working so far this day, for example, 3 hours and 3 minutes. The daily working time may be somewhat different than just subtracting the difference of the time at which the employee punched in, from the time at which the employee punched out, because each employer may have rules that penalize employees for arriving late, or rewards for employees arriving early, or the like. The last item on the line may be the total amount of time worked so far that week, for example, 3 hours and 3 minutes this week.

As the card is inserted there are certain checks made by the micro-processor computer device to insure that the card is being read properly. At the bottom of each data field 6 is a start code, shown at the left-hand side as the all black line 2A, the right-hand side all white start code 2B′. As the card T is inserted, then the micro-computer expects to see on the left side, for example, the black start code 2A; and then it expects to see ten data rows and then the upper left-hand white stop code 2B. In that period, there is a fixed number of clock-tracks which it must count; in this case, twelve.

When the computer reads a card, therefore, it looks at the two darkest marks in a column and checks to see that one is the start code 2A, whence the other is the desired mark. If one of those marks is not, however, the start field code 2A, and if the last row read is not the white code 2B, the computer rejects this and responds appropriately; in this case, generating a sound in the speaker 31 and causing one of the abnormal function indicator lights 13 to become lit. In such case, it is requested that the card be re-inserted.

As for the normal operation of a time card T, the employee's number is marked into the data field 6. As an example, the card in FIG. 3 shows an eight-digit employee number, 63659026. As a check that a data field was not improperly marked, such as by being off maybe one box, a check sum digit in the last column of the employee's number may be used. Considering the employee number 6365902, the last digit 6 is electronically computed from the first seven digits; and in fact the time clock checks that digit by comparing what it read to what it computes in the first seven, only accepting the card as properly identified with the employee user when the number it computes matches the number it reads. With the employee number precoded onto the card, the employee inserts the same into the guide 2, FIG. 1A, and as he inserts it, the data field 6 passes through the mark-sense detector 17, FIG. 2. The mark-sense detector electronically reads and extracts the information from the card and the computer then refers to this employee's previous identification and other information electronically stored in the data storage memory and computes what line is to be printed next. As this card is being inserted, a clock-track detector counts the number of clock-tracks 2′ that have passed, and when the same gets to the line which is to be printed, a card grabbing solenoid (which is part of the card printer assembly 19) grabs or clamps the card and holds it firmly, and, for example, the day of the month and the time of the punching-in will be printed, as at 10″. At that point, the card-grabbing mechanism will release and the employee is free to pull the card out of the system. The machine will know when the card is out of the device because the card detector 15 will so indicate, such that the apparatus is now ready to receive the next card.

There are certain abnormal events that might, however, occur when an employee punches in. As an example, the rules governing the employee's shift may not permit the employee to punch in at that particular time. If this happens, the time-clock does nothing; it does not grab the card and it does not print on the card. It does, however, display an illegal or improper entry indication on an abnormal function indicator lamp 13. As another illustration, the employee may forget to punch out. Let us say that the employee punched in at 1:52 pm on the 26th, and came back at 2:56 pm on the 27th. The clock, realizing that more that 16 hours had passed, which is the rule for determining a missing punch for this particular shift, would not then try to punch the employee out at that time. Instead, the clock may indicate a missing punch in the area where it would normally have punched out, and would proceed to the next line and punch the employee in on the 27th at 2:56 pm, considering that a punch-in.

The use of a special number on a card for a supervisor may enable the activation and use of the keyboard 27 which otherwise is inactive. The supervisor can now use the keyboard to enter commands as previously mentioned and as hereinafter detailed.

Another card may be used for maintenance, allowing an installation repairman access to certain software routines which are useful in determining what may be malfunctioning. In such instance, the maintenance card number will activate the keyboard 27, causing the keyboard to light up and making the same available for entering commands to test the various components inside the apparatus, as later more fully explained.

THE CONTROL LOGIC

Figure 4:
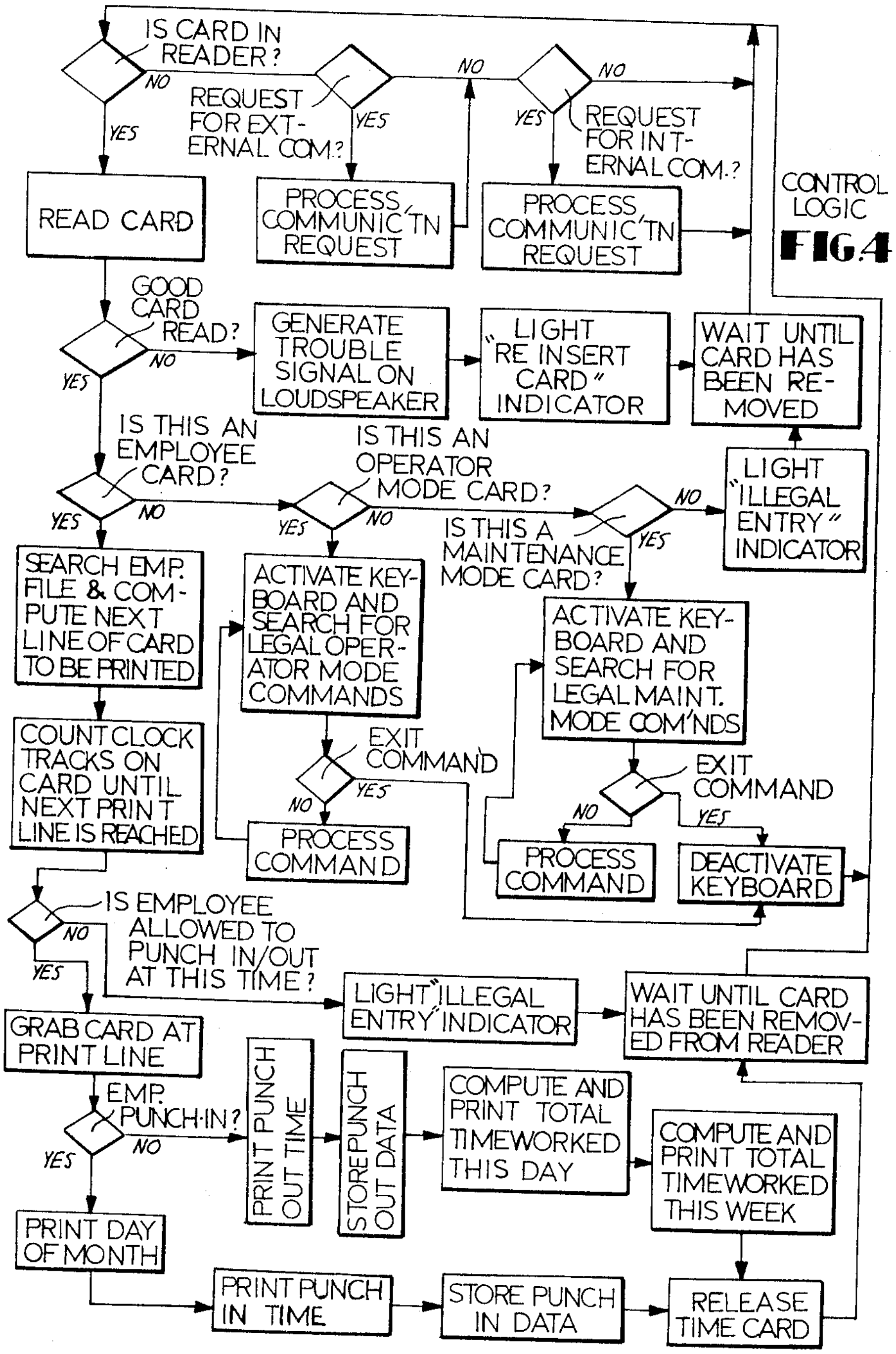
FIG. 4 is a control logic flow diagram of a preferred operational sequence for the apparatus of the invention.

It is next in order to discuss logic which controls the functioning of the apparatus in its normal mode. The logic diagram of FIG. 4 contains legends explaining the control function. Normally, the micro-processor 5, in addition to keeping track of time and displaying, is constantly looking for the insertion of a card into the card reader or mark-sense detector 17. If a time card time T is inserted and is detected by the card detector 15, then the data on the card is read. The alternative is that there is no card in the card reader and the card detector 15 has thus not detected anything; in which case, the computer looks to see if there are any requests for either internal or external communications, as at 25 and 23, FIG. 2. If there is such, the requests are processed and the computer returns to looking for a card being inserted into the reader.

Assuming a card is inserted into the reader, the data is read off by the mark-sense reader 17, and the processor must then determine whether this is a good card, by looking at the start and stop code marks 2A, 2B, etc. in relation to the twelve middle clock tracks 2″ on the card T, as before described in connection with FIG. 3. If this was not a good card read, then the processor generates a trouble signal on loudspeaker 31 to alert the user that the card was not read, and activates a trouble indicator light 13, lighting the legend "reinsert card" so the user knows to remove the card and reinsert the same, with the control logic waiting until the card has been removed before returning to looking for the insertion of a card in the reader.

If, however, the card that was inserted in the reader was in fact read properly and is a good card read, as described previously, then the processor must next determine what kind of card it is. It could, for example, be one of three types of cards. It could be an employee card; it could be a supervisor or operator mode card; or it could be a maintenance mode card. The processor knows if it is an employee card by the check digit at the end, as before described, since the supervisory mode card and maintenance mode card are particular numbers in which their eighth digit is not a check digit as in the case of an employee number. If none of these cards is recognized, the computer lights the illegal entry lamp and waits for the card to be removed from the reader before returning to normal processing.

If the card is in fact either a supervisory mode card or a maintenance mode card, the keyboard 27 is activated, as before explained, and the computer search is for either a legal operator mode command, or a maintenance mode command, respectively. The processor looks at the command to determine first if such is an exit command, meaning exit from either supervisor or maintainence mode. If it is an exit command, the keyboard 27 is de-activated, the light underneath the keyboard is extinguished, and processing goes back to looking for the insertion of another card into the reader. Should the command not be an exit command, than whatever it is, is processed; and the computer resumes searching for other commands until it receives an exit command.

Assuming, now, that the card that was inserted is an employee card, then the processor searches the employee file stored in the data storage memory 9, and computes the next line of the card which is to be printed. After that computation is made, it counts clock-tracks 2′ until the next print line is reached, and the computer also determines whether or not the employee is allowed to punch in at this time. If the employee is not allowed to punch in at this time, the computer lights the illegal entry indicator 13 and waits until the card has been removed from the reader, then resumes looking for another card to be inserted into the reader. If the employee is allowed to punch in at this time, however, the card is grabbed at the computed print line, and then the processor must determine whether the employee is punching in or punching out. If the employee is punching in, the printer prints the day of the month on the card and it prints the current time and stores the information in data storage memory 9. Then, it releases the time card T from the printer 19 and waits until the card has been removed from the reader before it resumes looking for a card to be inserted. If the employee is punching out, on the other hand, the computer will cause the punch-out time to be printed on the card and it will store the punch-out time in the data storage memory 9, computing and printing the total time worked so far that day and, in addition, the total time worked so far that week. When that is completed, the time card will be released from the printer 19 and the processor will wait until the card has been removed before returning to searching for the insertion of another card.

While this description contains the basics of how a card is processed, refinements are available. Should an employee forget to punch out, for example, as previously discussed, and this is determined by more than 16 hours having passed since the punch in, instead of grabbing the card and punching the present time as a punch out, the processor assumes that the employee has in fact forgotten to punch out. The processor will cause the card to be grabbed and it will print a missing punch in the area in which the employee was expected to punch out, and assume that currently the employee is punching in. Hours will be accumulated from that time, but with the ignoring of the area where the punch-out was forgotten since there is no way to compute the total time.

Referring again to the supervisory or operator mode command, there are at least two kinds of basic commands. The first type commands change or alters data in some way; and the second requests reports or summaries of the data in the clock. Examples of the former are commands to change the time of day, change the date, duplicate an employee's time card because it has been lost, authorize an employee to punch in when the employee would normally be prohibited from punching in, etc. Examples of the second kind of commands are asking for summaries of information from the clock such as a listing of all employees and how many hours they have worked so far this week or this day; or a summary of all the employees who punched in late; or a summary of employees who have not punched in at all today and are absent; or a summary of employees who have worked more than some specified number of hours, etc.

As an illustration of a particular supervisory or operation command, consider the requirement that the time being displayed by the clock be changed. The operator causes the clock to go into the operator mode by inserting into the card reader the supervisory or operator mode card which contains a special operation mode access code in the mark sense field. This serves effectively as a switch and, indeed, in an alternative version of the invention, the same function may be attained by means of, for example, an electrical key switch as later discussed. The system firmware recognizes that the number on this card is not an employee number because, as before explained, the last digit of an employee number is check-sum digit which can be computed from the first 7 of the 8-digit employee number. When the system computes the last digit on the supervisory card and finds that it does not match the last digit on the card, it looks through a table of special numbers, one of which is the supervisory or operator mode access code. Finding that the number on the code is the operator mode access code, the firmware causes the keyboard 27 to be illuminated and scans the keys for input commands. In the version illustrated in FIG. 1B, the keyboard command to change the time is *, 1, ENT. After entering this command, the operator enters the time on the keyboard (e.g., 1245A). Assuming no other corrections, commands, reports, etc. are required, the operator then returns the clock to its normal operating mode by entering *, 0, ENT on the keyboard. This deactivates the keyboard 27 and causes the time to appear in the numeric display 11.

There are decided advantages to the use of the card of the invention operating as a secure switch to enable the operator or supervisor to switch modes, and similarly the maintenance or diagnostic personnel to switch from normal operation to a diagnostic mode, as distinguished from mere key switches for changing from normal operation to the respective operator-supervisor or diagnostic modes. In accordance with the preferred card switching, the invention enables a print out, for example, of the particular maintenance routine that has been performed, providing a permanent record thereof. A further advantage resides in the fact that either prerecorded instructions on the card can be entered directly through the use of the card, or the keyboard may be employed for providing commands, or a combination of these techniques is available. The invention is, however, useful if resort is had to mere key switches, though such switching does not take full advantage of all of the features available with the card technique. As for an illustration of a maintenance mode command (e.g., expedite time), the time clock firmware includes a set of diagnostic routines designed to assist the repair and mainentance of the unit. These routines are accessible only when the clock is operated in its maintenance mode. One such routine enables three keys on the keyboard even after the clock has been returned to its normal operating mode. These three keys are used to speed up the rate at which time on the clock increments. The first key speeds up time by a factor of 60, the second by a factor of 600, and the third key restores it to its original rate.

To enter maintenance mode, the repairman inserts a maintenance mode access card which illuminates and activates the keyboard. The repairman then uses the keyboard to enter the speedup command. In the system of FIG. 1B, this is *, 5, ENT, for example. He then exits the command mode by entering *, 0, ENT. This will cause the keyboard illumination to cease and the keyboard will be partially deactivated. The clock will operate in its normal manner and will display the time of day, incrementing 1 minute each minute. However, if the "4" key is pressed, the time display at 11 will speed up, incrementing 1 minute each second. Pressing the "7" key will cause the time display to increment 10 minutes each second; and pressing the "1" key will cause the time display to return to its original rate, incrementing 1 minute each minute.

ELECTRICAL AND SUB-ASSEMBLY DETAILS

Figure 5:
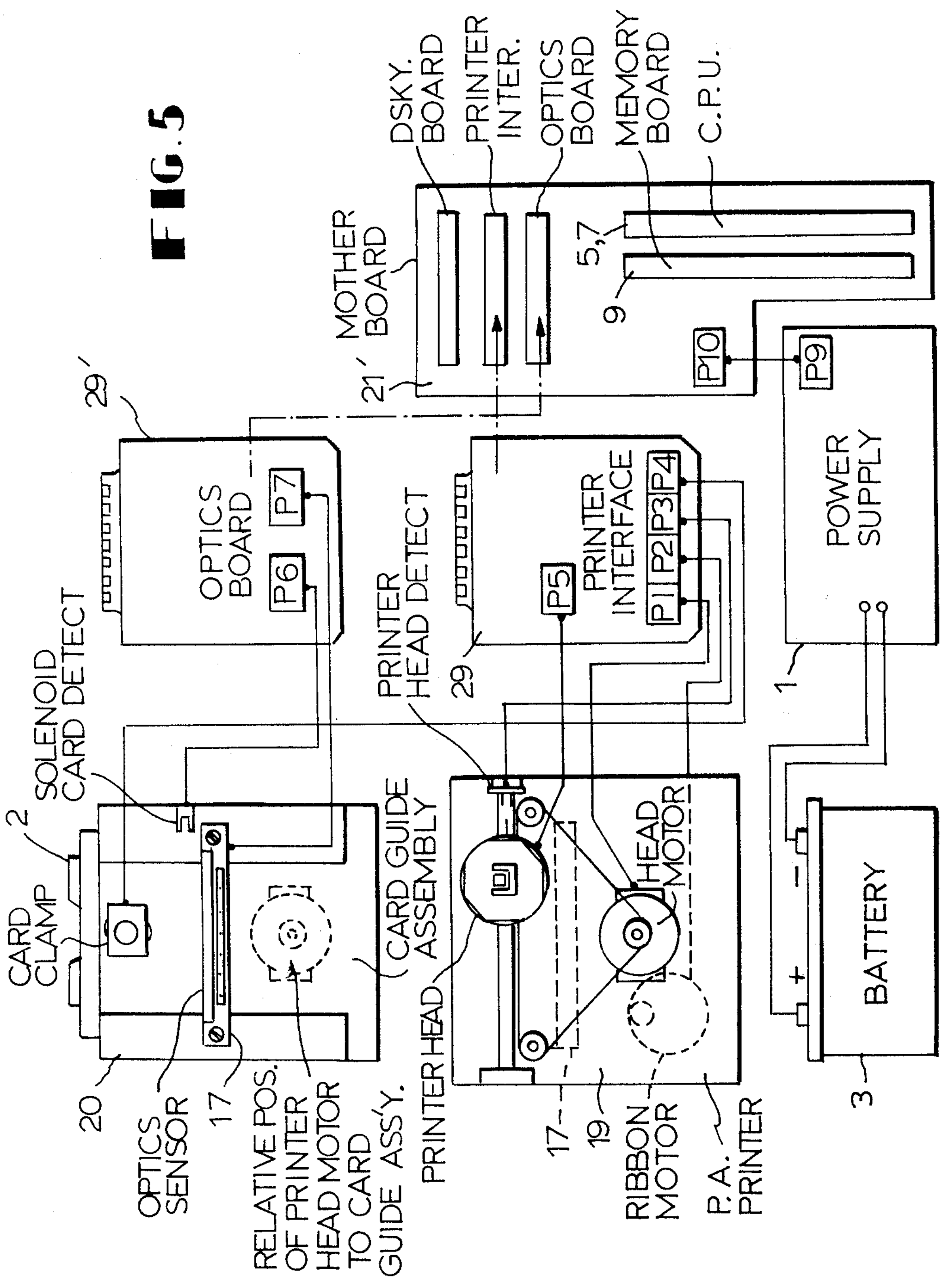
FIG. 5 is an expanded explanatory view of the interconnections of the card guide assembly, printer and electronic circuit boards of the system of FIGS. 1 and 2.

FIG. 5 shows how the various sub-assemblies are electrically connected, being particularly concerned with the sub-assemblies associated with the mark-sense detector or card reader 17, (namely, the card guide assembly 20 and the printer assembly (P.A.)19). and with the parts exploded and placed side-by-side and in cross-reference positions for explanatory purposes only.

The before-mentioned means for clamping and immobilizing the card at the appropriate point labelled "Card Clamp Solenoid" in the card guide assembly 20 of FIG. 5, is connected to the electronics located on a printer interface board 29, so-labelled, connected through plug P4 thereof. The previously described card detector 15 (FIG. 2) is mounted upon the printer assembly 19, being connected to plug P6 of the so-called optics board 29', containing all the electronics relating to the optical operation of the device. The sensor or card-reading block 17 (FIG. 2) which does the actual detection of the data in clock-tracks 2' of the cards T is shown mounted on the printer assembly and is connected via plug P7 to the optics board 29'.

A suitable printer for the purposes of the invention, for example, is the Model DTP9 manufactured by Practical Automation Company. The various operations of this type of printer 19 and similar printers are (1) activating the solenoids of the printer head that produce the dots via plug P5 to the printer interface board 29; and (2) moving the array of dot-making solenoids laterally by a stepping motor referred to as the printer "head motor", controlled by connection to plug P1 of the printer interface board 29. The printer 19 also contains a photodetector or other detector, labelled "printer head detect", for detecting when the printer head has reached the end of the line and needs to be re-positioned at the beginning of the line, being shown connected to plug P3 on the printer interface board 29. FIG. 5 also shows how the before-mentioned battery 3 and power supply 1 are connected to the mother-board 21', FIG. 1C.

Referring again to assembly 19 of FIG. 5, the ribbon advance motor for the printer, so-labelled, is shown connected to plug P2 of the printer interface board 29, and is used to advance the ribbon during the printing, for wear considerations.

The CPU (central processing unit) board contains the microprocessor 5 and the program memory (PROM) 7 of FIG. 2, and is located on the mother board 21' alongside the random access memory board 9 for data storage. Above those is shown the location of the optics board 29' containing the electronics used to read the information off the card, and above that is the printer interface board 29 which contains the electronics needed to drive the various above-mentioned functions of the printer. Above these is a board labelled "DSKY" that has the electronics to drive the display and to decode the keys on the keyboard 27, FIGS. 1A–C.

A suitable optics sensor assembly, array or block 17 for mark-sense reading of the information on the card is detailed in FIGS. 6A and B, with an array of lamps 17' mounted on a board to illuminate a particular area of the card, preferably through a green-glass filter or the like to filter out the large amount of infrared spectrum. The phototransistor array is exposed through openings 17" to a restricted field of view corresponding to that area on which marks would be put onto the card; the phototransistors either seeing a significant amount of reflected visible light if the card is basically white or unmarked, or a very small amount of light if the card has been marked with a black box that absorbs, as distinguished from reflecting the light.

FIGS. 7, 8 and 9 show how the components of the electronics are electrically connected and controlled by the microprocessor 5, which, as is well known, has an architecture comprising address, data, and control busses. In connection, for example, with an 8-bit microprocessor 5, the data bus is shown in FIG. 7 as provided with eight lines to transfer its data, eight bits at a time. The address system is a 16-bit address bus permitting the addressing of up to 64,384 words of memory; and the control bus is shown as a 4-line control. The microprocessor busses are interfaced to the PROM 7 (FIG. 2) containing the program instructions with the address and control lines connected to standard decode circuitry, and the data bus connecting directly to the appropriate lines on the PROM to read data out into the microprocessor. The random access memory circuit 9 (RAM), is also shown in FIG. 7 even though this is physically located on a different board than the CPU and PROM as previously described in connection with FIG. 5. The decoding of the addresses is done in a fashion similar to that of the PROM and again the data lines are connected directly to read the data into the microprocessor 5 and to write data from the microprocessor into the RAM 9. Such bi-directional data flow is indicated in FIG. 7 by the opposite arrows at "DATA" at the RAM circuitry 9, as opposed to the PROM which is uni-directional, as indicated by the single arrow "DATA" thereabove.

FIG. 8 is an extension of the busses of FIG. 7, showing how they interface to other sub-assemblies of the time-clock including the printer 19, the keyboard 27, the clock-track detector and the mark-sense circuit 17. Again, the indicated decoding is by standard well-known technique. Suitable specific circuitry for the printer 19, the keyboard 27 and clock-track and mark-sense 17 are hereinafter described in connection with respective FIGS. 10, 11, 12 and 13.

FIG. 9 is a further extension of the bus structure of FIG. 8, showing an interface to the communications circuitry 23 and 25 discussed earlier in connection with FIG. 2. Considering the external communication at 25, such as to a computer whose purpose it is to poll all the time clocks of an installation and to collect or gather the information, interfacing may be effected by an RS-232C type interface, in turn connected with a modem of, for example, the Bell 103 (or similar Vadek Corporation Modem—, 1976 bulletin "Why Modems"). (See, also, Motorola Semi-Conductor Products Inc., application Note AN-747, Low-Speed Modem System Design Using the MC6860). The actual interconnecting to the telephone lines is made via a DAA (data access arrangement). This is normally supplied by the Bell Telephone Company for automatically answering the telephone lines (suitable Bell model numbers being listed, such as the CBS1001A or F, or the CBT 1001 B or D). As for the internal communications for talking to other time clocks located over some defined area, as before discussed, the first task is the synchronization of all the time clocks, as by having one time clock tell the other time clocks what time it is. Another purpose for this internal communications, as previously mentioned, is to enable many time clocks to talk to the same central computer via the telephone line, but avoiding problems such as time clashes, etc. This may be accomplished by having one clock serve as master to talk to the central computer via, for example, the Bell 103 compatible arrangement previously described, and with this clock taking commands which are then relayed to the other clocks of the system, so that only one clock need be directly connected to the telephone line. In FIG. 9, accordingly, one clock (#1) is shown connected to another time clock (#2) with the aid of well-known frequency-shift keying modulators at 23.

Returning to FIG. 8, it remains to describe in detail suitable printer circuitry 19, keyboard circuitry 27, and clock track and mark-sense circuitry 17 for the practice of the invention.

Figure 10:
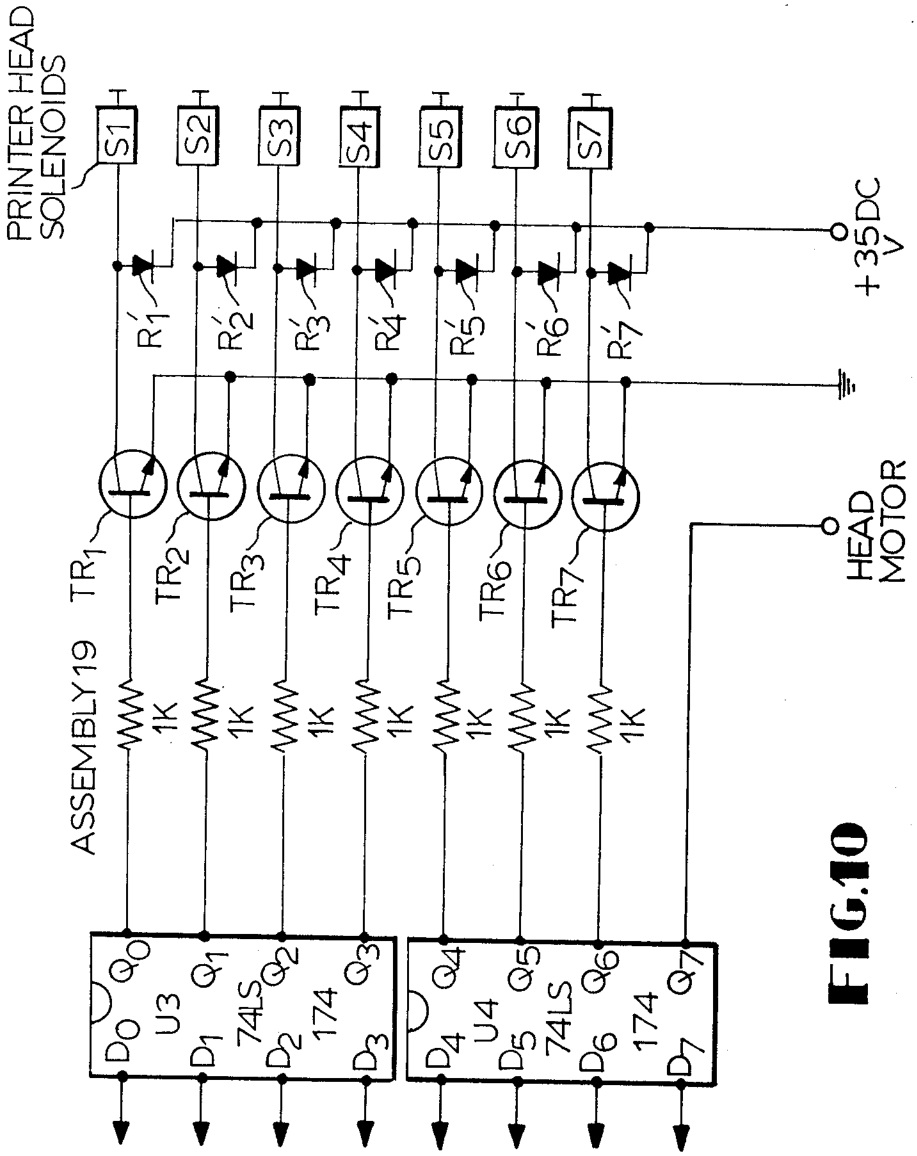

A preferred printer circuitry 19 is illustrated in FIG. 10 for controlling the actual printer mechanism earlier described in connection with FIG. 5. FIG. 10 shows seven input data lines $D_0$–$D_6$ connected through buffers U3 and U4 to drive respective transistors TR1-7 which in turn are connected to each of the seven solenoids S1–S7 controlling seven dots in the dot markers of the printer head. The last line D7 is used to supply power to the head motor that drives the head across the print line as described in the embodiment of FIG. 5. Diodes R'1–R'7, shown connected across the solenoids S1–S7, are used to prevent improper negative voltages, occurring as a result of solenoid magnet current drive, from destroying the drive transistors.

Figure 11:
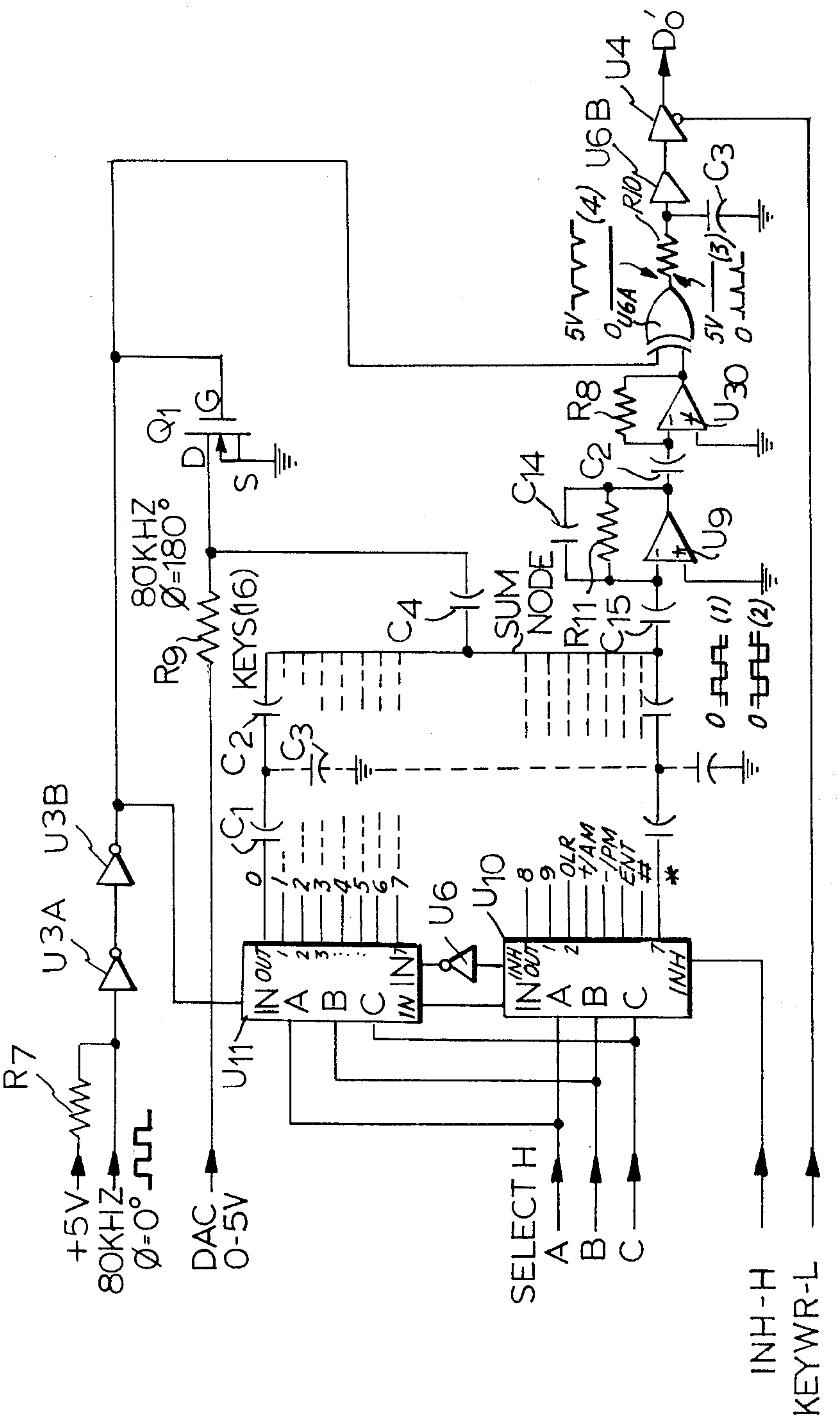

In FIG. 11, a schematic diagram of a suitable capacitive keyboard 27 is shown, with the keys represented by capacitors. The signal from a square wave oscillator (say 80 KhZ) that goes through the capacitors of the keyboard is normally in phase with the signal that does not go through the keyboard. Putting a finger on one of the capacitor keys, however, varies the phase such that the output is altered. Specifically, the free-running 80 Khz square wave oscillator signal is applied to the input of a buffer U3A for buffering. U3B returns the phase, $\phi$, to 0°. This buffered signal is then applied to the inputs of: analog multiplexers U10 and U11; input-a-of exclusive-OR U6; and to the gate of $Q_1$. Outputs 0-7 of U11 are successively selected while U10 is inhibited; then outputs 0-7 of U10 are successively selected while U11 is inhibited. This addressing process is repeated until the data is detected at $D_0'$, indicating a character has been selected. The addressing process begins again after data has been entered.

Operation Mode I (no character selected)

The 80 khz signal, $\phi=0°$, is multiplexed to output 2 of U10; i.e., a character "CLR". Since the "CLR" character has not been selected, the $\phi=0°$ signal appears at nearly full amplitude at the sum node through $C_1$ and $C_2$. Another signal, $\phi=180°$, also appears at the sum node via the drain of $Q_1$ through $C_4$. Due to the level of the DAC, the $\phi=180°$ signal amplitude is much lower than that of the $\phi=0°$ signal. The signals add, and result is a signal of $\phi=0°$ at a reduced amplitude.

AC coupling at both the input and output of U9 provides a signal (at the output) of $\phi=180°$, swinging above and below ground. U30 is a linear inverting amplifier, thus returning the phase to 0°, and also references the signal to ground. U6A performs the indicated exclusive-OR function and in this case (Mode I), the output is (3) as shown; i.e., (1) at the sum node produces (3) at the exclusive-OR output. U6A output (3) appears noisy due to slight phase shifting of U6A input b. This arises from additional gate delays along that signal path. Delay $\tau$ is used for reducing the "spikes" to below threshold values, and is about 5 mS. U6B is used for buffering to U4. U4 gates the data (in this case "0") with KEYWR-L. Since no data was present, the selection process addresses the next character to "see" if it has been selected.

Operation Mode II (character selected)

Operation here is similar to Mode I so far as signal paths are concerned, but with the following differences.

Since a character has been selected, the 80 khz $\phi=0°$ signal at the MUX output is effectively grounded through capacitance $C_3$. The output of $C_2$ (at the sum node) is approximately 0.

The only signal now appearing at the summing node is the low amplitude $\phi=180°$ signal (2) coupled through $C_4$. Signal (2) at the sum node produces signal (4) at the exclusive-OR output. Following through, as before, this case (Mode II) produces a logic 1 at the output of U4, and "1" is entered when Key WR-L is applied, thus entering that character.

The calibration signal from the DAC must be selected is such a way as to make the amplitude of the $\phi=180°$ signal (2) the same as the amplitude of the combined $\phi=0°$ signal (1) as in Mode I, and at the same time not be too great as to overcome the $0=0°$ signal in Mode I, thus creating a false $D_0=1$ at U4. This calibration takes place automatically via hardware-DAC-software interfacing.

THE CLOCK-TRACK AND MARK-SENSE READER CIRCUITRY

An important feature of the invention, in preferred form, as before noted, is the relaxed requirement on type of card and on the markings upon the card. The invention, indeed, also provides a novel mark-sense reader that reliably distinguishes intentional marks from accidental marks, such as dirt, finger prints, etc., and additionally meets cost constraints with efficient use of microcomputer components required for other purposes. As previously discussed, prior mark-sense readers employ threshold-operated comparator circuits in which the transition threshold from dark to light is absolute. If an unintentional mark is darker than the threshold, or an intentional mark is lighter than the threshold, such will be misinterpreted. In addition, there are considerable difficulties and costs in matching thresholds from channel to channel, and in maintaining the threshold settings as functions of time and temperature.

In accordance with the present invention, on the other hand, recognition may be made of the fact that reading the clock tracks 2' and 2'', in which the optical density of the printed dark marks is known, is a fundamentally different process than reading the data channels in which the optical density of the marks are not pre-determined. The mark-sense reader of the invention, therefore, in preferred form, uses a different circuit for the clock track than is used for the data channels, as will now be explained.

Figure 13:
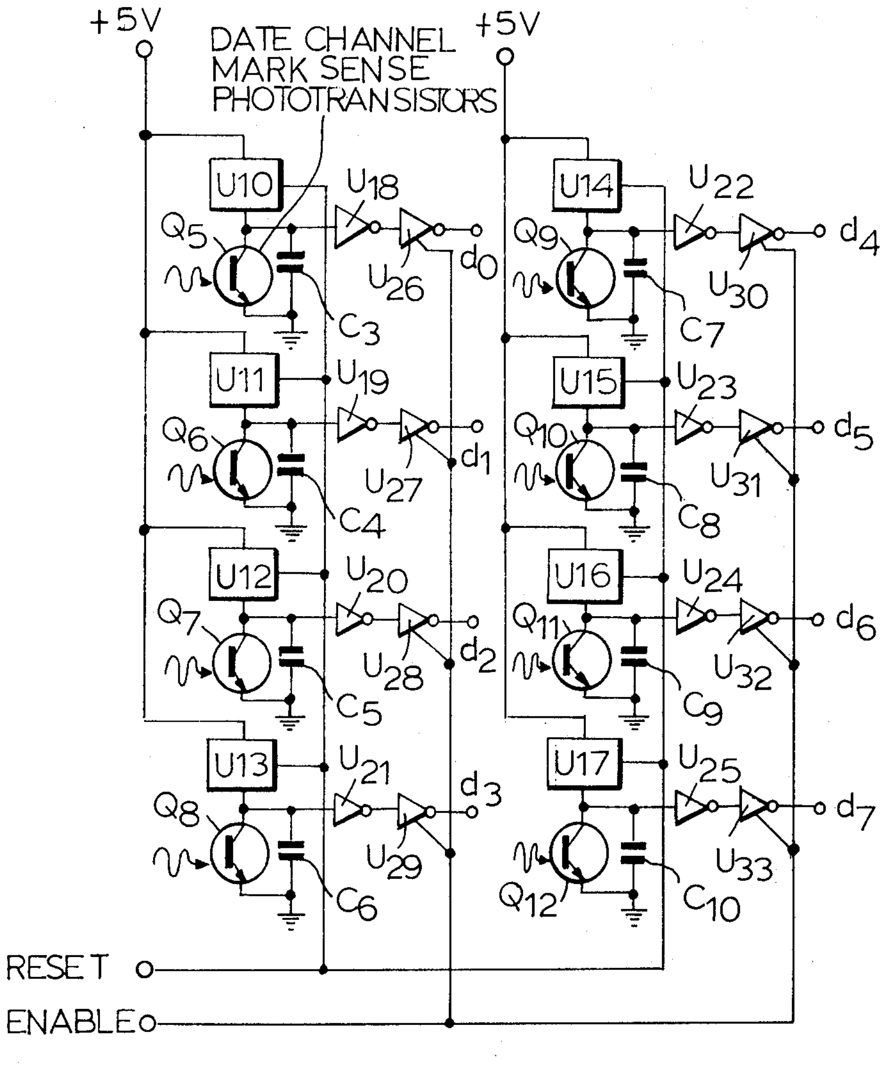

Turning, first, to the mechanical aspects of the novel mark-sense reader of the invention, as shown in FIG. 1A, opposing plastic guides 2, preferably of black light-absorbing material, are used to direct and align the card T as it is pushed down in front of the line or block of phototransistors 17, labelled in FIG. 6B with notations Q5, Q6, etc., to correlate with the phototransistors in the circuit diagram of FIG. 13. As before explained, the field of view of the phototransistors is limited to an area corresponding to the individual mark-sense blocks or spaces in the data region 6 on the time card T, FIG. 3. The light generated from the lamps 17' is thus either mostly absorbed by a black mark or mostly reflected by the white card; and the presence or absence of this light is detected by each of the phototransistors. Since the card guide 3 is of black light-absorbing material, as before stated, the mark-sense detector cannot distinguish a black mark on the time card from the condition of the non-existence of a time card. The card-detector LED light source and phototransistor 15 of FIG. 2 is therefore provided, to be activated by the reflection of light from the card (though transmission could also be used), thus to enable an unambiguous determination of the presence or absence of a card.

Figure 12:
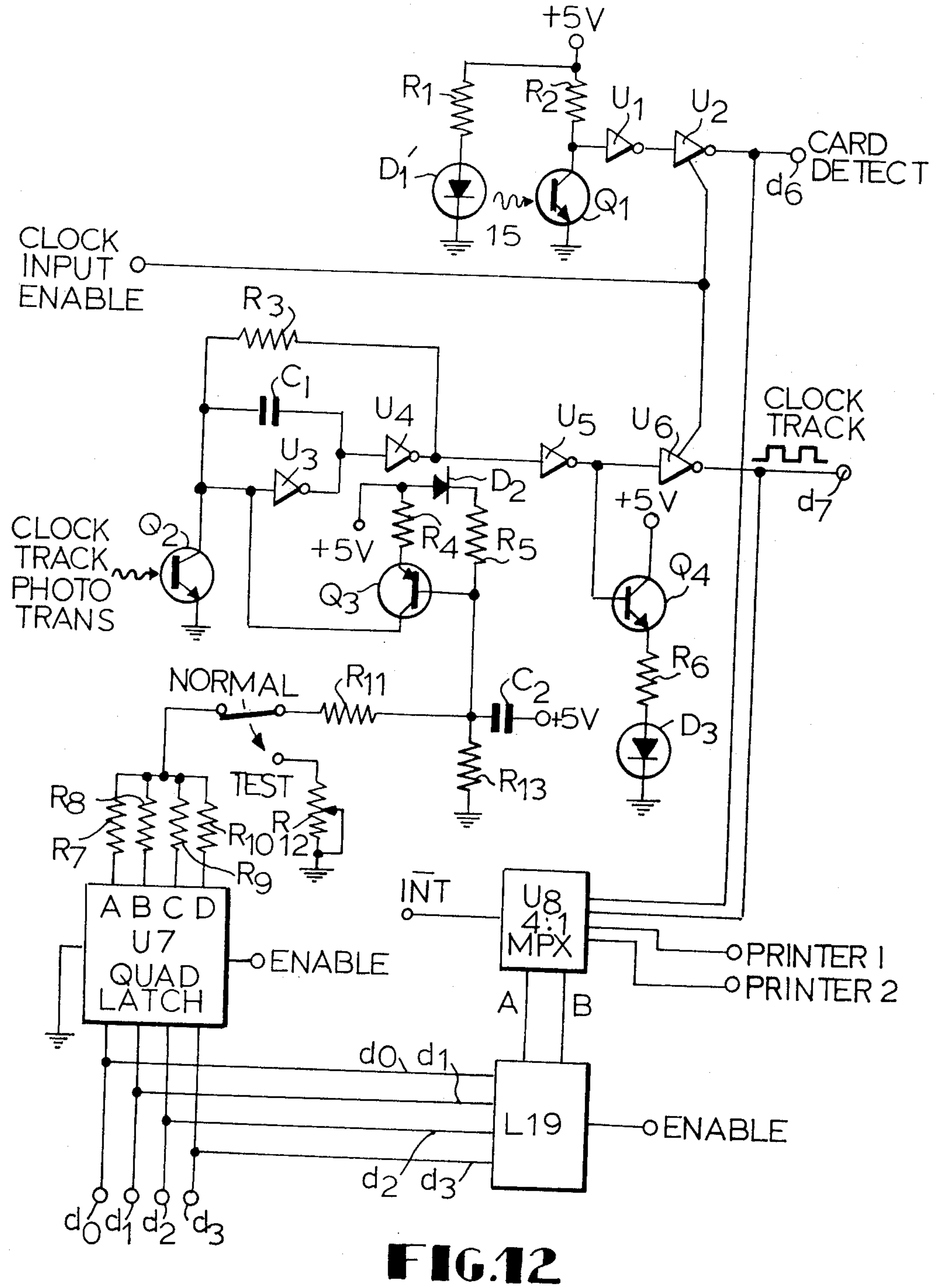

Considering, initially, the clock track mark-sense electronics, FIG. 12, the light-emitting diode D1' and phototransistor Q1 comprise the before-mentioned card-detect circuit 15 of FIG. 2. The voltage at the collector Q1 is high when a time card is in the mark-sense reader and becomes low when the card is removed. Invention U1 is used to sharpen the transition of this waveform, and connects with a buffer U2, the outputs of which are enabled by a "clock input enable" signal. When not enabled, the output of U2 is in a high impedance state, thereby isolating the card-enable circuit from the data line D6 of the microprocessor 5.

Q2 is the phototransistor of the array that detects the light reflected from the clock track marks 2′, FIGS. 3, 6C, and its sensitivity is determined by the amount of current provided to the collector of Q2 from a constant-current source consisting of Q3 and resistor network R4, R5, R13, and R11. Diode D2, connected between R4 and R5, is provided for temperature compensation, while a capacitor C2 is provided at the junction of R5-R11-R13, to limit high frequency response. The amount of current sourced by Q3 is determined by the voltage divider formed by resistors R5 and R13 in parallel with a combination of R7, R8, R9 and R10. These resistors are tied to the microprocessor data lines d0, d1, d2, and d3 through respective four latches U7A–U7D. The data line also connect with latches U9 controlling the printer operation through U8 also inputted from card detect and clock track lines d6 and d7. The outputting of a logical "zero" on a data line and enabling of latch U7 grounds the corresponding resistor; i.e. puts it in parallel with R13, thereby decreasing the effective resistance of the resistor network. A logical "one" on any of the data lines d0–d3, however, will produce the opposite effect; i.e. it increases the effective resistance of the network. The sensitivity of the clock track phototransistor Q2 therefore can be controlled by the program in the microprocessor 5. Capacitor C1 limits the high frequency response and resistor R3 provides hysteresis to increase noise imunity by spreading the positive and negative going transition levels. Buffers U3 and U4 are shown respectively provided across C1 and in series across R3, with U4 connecting to buffer U5 feeding the base of later-described Q4 and buffer U6.

Transistor Q4 sources current to LED D3, through a current-limiting resistor R6, to provide a visual indication of the performance of the card detector sensor for diagnostic purposes. The base of Q4 connects with a buffer U6 with tri-states outputs identical to U2. The microprocessor 5 operates the clock track detector in the following manner. In normal condition, the card detect interrupt is enabled, such that when a card T is inserted, the microprocessor receives an interrupt indicating that the signal on data line d7 is black (because the plastic card guide 3 is black). The microprocessor then immediately calibrates to black, before the white card reaches clock track phototransistor Q2, by first pulling resistors R7–R10 high by means of latch U7. This causes the output on d7 to indicate black. Parallel resistor combinations of R7–R10 are then sequentially pulled low (in order of decreasing effective pull-down resistance) until the output on d7 corresponds to white. At this point, the effective resistance is increased until the output on d7 returns to the black state at a level just above that needed to transistion to white.

The operation is now in condition for the card edge to pass phototransistor Q2. This is indicated by output d7 transitioning from black to white. The circuit now increases the effective pull-down resistance of the parallel combinations of resistors R7–R10 until the output on d7 indicates black. At such a time, the effective pull-down resistance is decreased until the output on d7 returns to a white state at a level just below that needed to transition to black. This sensitivity setting may be called the "white sensitivity". The reaching of phototransistor Q2 by the block calibration mark is now awaited. The computer now decreases the effective pull down resistance until d7 indicates white and then backs off until d7 returns to a black state just above that needed to transition to white. This setting may be called the "black sensitivity". The computer then calculates the clock track threshold to be approximately halfway between the black sensitivity and the white sensitivity and then causes U7 to implement a resistor combination corresponding to this value.

As before stated, the data channel mark-sense detectors Q5, Q6, etc. operate differently, in accordance with the invention, from the clock track circuit of FIG. 12. The schematic diagram of the data channel mark-sense detectors, is shown in FIG. 13. The phototransistors Q5–Q12 correspond to the array 17 of FIG. 6B. Each phototransistor is associated with a CMOS bilaterial switch (such as types 4016's or 4066's), labelled U10–U17 to correspond with respective phototransistors Q5–Q12. The bilateral switches U10–U17 are activated by means of the "reset" line when initiated by the clock track interrupt, thereby allowing respective capacitors C3–C10, connected between emitters and collectors of respective phototransistors Q5–Q12, to charge. As soon as possible thereafter (i.e. a few instruction cycles of the microprocessor 5), switches U10–U17 are de-activated. The phototransistors Q5–Q12 will then discharge their respective capacitors C3–C10 at different rates, proportioned to the amount of light incident upon them. Those phototransistors receiving more light will have a lower collector-to-emitter impedance and will discharge their corresponding capacitors at a higher rate. Buffers U18–U25 are respectively connected to capacitors C3–C10 to sharpen the waveforms into negative-going edges that transition when the capacitors are about half discharged. Tri-state latches U26–U33, respectively connected to buffers U18–U25, and the corresponding output data lines d0–d7 are read by the microprocessor 5. Initially, there will be "1's" on all of the data lines because the capacitors have not had sufficient time to discharge. The reading process is repeated until one of the data lines transitions from high to low. The resulting data word is stored in memory along with the total number of reads may by the microprocessor up to the occurence of this transition. The reading process is then continued, storing the data word and the read number (which corresponds to the decay time) each time a transition occurs on one of the data lines. When all of the data lines have transitioned to the low state, the reading of this mark-sense row or line is terminated.

Upon receipt of another clock track interrupt, the next row or transverse line of mark-sense data is similarly read. This process is repeated twelve times, corresponding to rows or lines for the start code 2A, stop code 2B and 10 digits for the format 6 of the card T of FIG. 3, as before explained. The microprocessor, in conventional manner, now sorts the data, which was stored by rows, into a column format. For each of the 12 entries in each column, the decay times are compared and the entries corresponding to the two longest decay times are selected. Since operation in accordance with the invention requires one and only one intentional data mark in each column in the mark-sense field 6 of the time card T, one of the entires selected by the microprocessor must be either the start code or stop code (depending upon the column). If, however, neither mark selected corresponds to the correct start or stop code, the reading of this card is considered to have been unsuccessful; and the appropriate responses are initiated by the microprocessor.

MICROPROCESSOR CONTROL

While it is considered that, from the foregoing, one skilled in this art can readily practice the invention, for purposes of completeness, a suitable computer program for controlling the mark-sense reader, printer, displays, etc. will now be outlined. The software structure consists of three prioritized levels of external I/O functions. The highest priority functions are the following three versions of the 60-cycle interrupt handler. One version is used if the interrupt occurs while the control program is executing the initialization routine. The second, is the normal 60-cycle interrupt handler which updates both the time data and the display, as well as operating the bell schedule; and the third is used if an interrupt occurs while reading a time card, and it just updates the time data. Because a cumulative time error will occur if these interrupts are not processed, they have the highest priority and are non-maskable. The next priority level processes interrupts generated by the card-detect sensor 15, clock track detector $Q_2$, etc., and printer timing pulses. These interrupts are maskable, and should a 60-cycle interrupt be received while processing these functions, they are themselves interrupted and execution of the fast (3rd) version of the 60-cycle interrupt functions is then completed. The type Z-80 microprocessor, for example, has been found fast enough to complete the execution of both the maskable and unmaskable routines in the required amount of time, even for reading clock tracks. The lowest priority level is given to the scanning of the keyboard 27, handling communications between multiple clocks on a single system at 23, FIGS. 2 and 9, and handling communications between the clock and the central payroll processing computer as at 25. This function is processed by having the computer cycle through the appropriate I/O ports until it is interrupted by a priority 1 or 2 function.

Time Clock Program Control Logic (Power on Interrupt)

INITIALIZATION ROUTINE 1. load the interrupt vector with the address of the non-maskable interrupt handler which just returns to the program currently in execution so that the initialize procedure will be completed regardless of any interrupts which may be prematurely received.
2. scan the keyboard until the time of day and date have been entered.
3. load the interrupt vector with the address of the version of the non-maskable 60-cycle interrupt handler which updates the time of day information, updates the time display and implements the bell schedule.
4. initialize all data tables and variables.
5. load the interrupt vector with the address of the maskable card detect interrupt handler.

PROGRAMMED I/O ROUTINE (start)

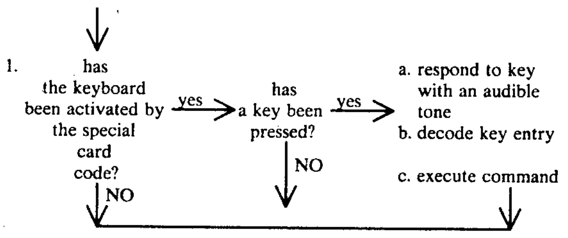

2. check local communications port for data updates from other clocks on the system.
3. check the external communications port for data requests from the payroll processing computer.
4. loop back to 1 and continue cycling until interrupted.

Mark-Sense Card Read Routine (card detect interrupt)

CARD READ ROUTINE 1. load the interrupt vector with the address of the version of the non-maskable 60-cycle interrupt handler which only updates the time of day information and then returns.
2. calibrate the clock channel to the reflectance of the black plastic card guide.
3. look at data line d7 until white from the bottom edge of the card has been detected.
4. calibrate the clock channel to the card white sensitivity.
5. look at data line d7 until black from the clock track on the card has been detected.
6. calibrate the clock channel to the card black sensitivity.
7. set the clock channel transition threshold approximately half way between the card black and white sensitivities.
8. set the hardware interrupt selector to look for clock track interrupts.
9. load the interrupt vector with the address of the maskable data channel mark sense read interrupt handler.
10. wait for clock track interrupts.
11. read a row of mark sense data
12. loop back to 10 and cycle through 12 times in order to read the start code, stop code, and ten digits for each columm.
13. decode and assemble the mark-sense data columm by columm (Process Card)

Mark Sense Card Processing Routine

CARD PROCESSING ROUTINE 1. is data flag set? i.e. is this a continuation card? —yes→
   a. store the data in the data buffer
   b. increment the data buffer address
   c. acknowledge that the data is good
   d. go to the card removal subroutine ↓ no 2. compute the employee number check digit from the first 5 numbers on the card 3. does it match the check digit on the card? —yes→
   a. compute the clock track number at which the solenoid is to be activated in order to grab the card for printing
   b. assemble the data to be printed while counting clock tracks
   c. if the desired print line has not been reached and the employee buffer needs to be expanded or this is a new employee number, then expand or create the employee buffer and adjust the buffer address table accordingly
   d. count clock track until the desired line is reached
   e. activate the card grab solenoid
   f. print one line of alphanumerics on the card
   g. release the card grab solenoid
   h. go to the card removal subroutine ↓ no 4. is this a parameter card? —yes→
   a. set the data flag
   b. set the parameter card counter
   c. set the data buffer address
   d. go to the card removal subroutine ↓ no 5. is this a bell schedule card? →
   a. set the data flag
   b. set the bell schedule card counter
   c. set the data buffer address
   d. go to the card removal subroutine ↓ no 6. is this an employee summary card? →
   a. count clock tracks while assembling the print lines
   b. activate the card grab solenoid when the card gets to the topmost print line
   c. complete assembly of the print lines
   d. print line
   e. release card grab solenoid
   f. if last line go to card removal subroutine, otherwise grab card at next print line and loop to d.

↓ no

-continued is this a shift summary card? a–f as above

↓ etc.

CARD REMOVAL SUBROUTINE

1. Read output of card detect sensor on data line d6.

2. is card still in reader? →yes loop back to 1.

↓ no 3. is this a data card? →yes is this the last data card? yes
   a. reset the data flag
   b. go to START no ↓ no 4. go to START The invention, accordingly, not only provides the flexibility for automating employee time and attendance records, and in format directly useable by and transmitted to payroll processing or other computers, but provides the flexibility for entering additional data and revisions without the need for custom programming, and accomplishes all these ends with the added advantage of the use of a simple time card and any convenient marking means. These results are accomplished, moreover, without the earlier-described limitations and disadvantages of prior equipments and techniques. While described in connection with the preferred embodiment and application illustrated, it is evident that the improvements herein presented may also find use in other applications where the advantages of such improvements are also sought; and that other circuit and mechanical configurations and modifications for practicing the underlying techniques of the invention will also suggest themselves to those skilled in this art, such, accordingly, being deemed to fall within the spirit and scope of the invention as defined in the appended claims.

What is claimed is:

1. A method of time-clock recording for use with a time and other data card provided with information identifying the user and space for recording additional data, that comprises, electronically storing identification, time and other data of users; electronically reading the identifying information on a user's card at times of check-in and check-out; withdrawing from such electronic storage, in response to such reading, data associated with the user; electronically totaling time periods between times of check-in and check-out to maintain stored data as to summary time periods for the user; and recording such summary time period data upon the said space of the card at check-out.

2. A method as claimed in claim 1 and in which the further step is performed of directly transferring the stored summary time period data for remote processing.

3. A method as claimed in claim 1 and in which the card is provided with a plurality of successive marginally disposed markers, and the further steps are performed of monitoring the markers and determining the appropriate marker associated with the next suitable data recording location on the card; stopping the card at such location; effecting the said recording at such location, and thereafter releasing the card.

4. A method as claimed in claim 3 and in which the card is further provided with an intermediately disposed plurality of successive longitudinally disposed markers dividing a marking field, and the further steps are performed of monitoring the last-named markers and sensing marks within said field.

5. A method as claimed in claim 1 and in which the user identification is indicated on the card by a train of digits, and the further step is performed for purposes of said identification of comparing a terminal digit with a sum of other digits of the train.

6. A method as claimed in claim 5 and in which the failure of such identification activates an indication thereof.

7. A method as claimed in claim 1 and in which the further steps are performed of switching the operation of the time-clock recording to one of a supervisory mode and a maintenance mode, and introducing instructions for respectively changing and testing the operation.

8. Time clock recording and computation apparatus for use with a time and other data card provided with information identifying the user and space for recording additional data, said apparatus having, in combination, means for receiving the card and permitting its insertion along a predetermined path; means disposed along said path for reading and identifying information; normally ineffective means disposed along said path for recording additional data, when rendered effective, in the said space of the card; microprocessor and memory means having means for storing identification and other data, means responding to the reading of said identifying information on said card for totaling time periods between times of insertion of said card, and means for generating and storing summary data as to the user and corresponding time periods; and means for applying such data to the recording means to render the same effective to record the same in the said space of the card so that instantaneous summaries of data are available on the card and in the storing means.

9. Time clock recording and computation apparatus as claimed in claim 8 and in which means is provided for enabling direct transfer of said summaries of data from the said storing means to remote processing apparatus such as payroll processors and the like.

10. Time clock recording and computation apparatus as claimed in claim 8 and in which means is provided for adjusting time periods in accordance with predetermined rules to provide the desired summary data.

11. Time clock recording and computation apparatus as claimed in claim 8 and in which the card is provided with a plurality of successive longitudinally disposed markers, and means is further provided for sensing said markers to determine the appropriate space location on the card for the next suitable recording of data on the card, means for stopping the card during its said insertion at such location, and means operative following the recording of the said data by the said recording means at such location for thereafter releasing the card.

12. Time clock recording and computation apparatus as claimed in claim 8 and in which the card is provided with a clock track comprising a plurality of successive longitudinally disposed markers, and means is further provided for mark-sense reading comprising clock track detector means aligned with said track and a plurality of data channel detector means for reading data marked on said card.

13. Time clock recording and computation apparatus as claimed in claim 8 and in which the said user identifying information is indicated on the card by a train of digits, and means is provided for comparing a terminal digit with a sum of other digits of the train to effect such identification.

14. Time clock recording and computation apparatus as claimed in claim 13 and in which abnormal function means is provided responsive to said comparing for indicating failure of such identification.

15. Time clock recording and computation apparatus as claimed in claim 8 and in which means is provided for switching the operation of the apparatus to one of a supervisory mode and a maintenance mode, and normally ineffective keyboard means activated by such switching for introducing instructions for respectively changing stored information and testing the operation of the apparatus.

16. Time clock recording and computation apparatus as claimed in claim 15 and in which said switching means is a card containing appropriate identification and command data.

17. Time clock recording and computation apparatus as claimed in claim 16 and in which means is provided to enable said information changing to be effected by a combination of operation of said keyboard means and said card command data.

18. Time clock recording and computation apparatus as claimed in claim 8 and in which said memory means comprises both program memory and data storage memory means, and there is further provided, numeric display means for indicating the time, and means operable upon the said insertion of the card for detecting the presence of the card.

19. Time clock recording and computation apparatus as claimed in claim 18 an in which the said reading means comprises mark-sense detector means.

20. Time clock recording and computation apparatus as claimed in claim 19 and in which said mark-sense detector means comprises an array of optical-sensing detectors disposed along the said predetermined path.

21. Time clock recording and computation apparatus as claimed in claim 20 and in which said recording means comprises dot-matrix printer means responsive to the said data from the said microprocessor and memory means.

22. Time clock recording and computation apparatus as claimed in claim 8 and in which means is provided for enabling direct transfer of data from said storing means to one of external and internal communications ports.

23. Time clock recording and computations apparatus as claimed in claim 22 and in which said external communications port comprises modem and automatic answer telephone link means.

24. Time clock recording and computations apparatus as claimed in claim 22 and in which said internal communications port comprises frequency-shift-keying modem means connected to cooperate with other similar time-clock recording and computation apparatus for such functions as synchronization and ordering communications channels.

25. In a time clock apparatus provided with means for receiving time-card means optical mark-sense reader means and means for sensing time-card presence and card position along said receiving means, time card means for insertion in said receiving means and having a plurality of successive marginally disposed markers for enabling card-position sensing, a mark data field for receiving identification marks for mark-sense reading, a print-out field having blank regions corresponding to the marginally disposed markers for receiving print-out of time and related data alongside the appropriate card-position marker, and a card presence sensing region for enabling indication of the presence of the time card means within the receiving means.

26. In a time clock apparatus as claimed in claim 25, the time card means being further provided with predetermined stop and start marks at the bottom and top of said mark data field for mark-sense reading verification.

27. In a time clock apparatus as claimed in claim 25, and wherein means is provided for predetermining an appropriate card-position marker for next print-out location, means for stopping the time card means to enable print-out when the card-position sensing detector means has counted a predetermined number of said marginally disposed markers, during the insertion of the time card means in the said receiving means, defining said appropriate card-position marker.

28. In a time clock apparatus as claimed in claim 25, the time card means being further provided with a further set of successive markers extending through and intermediate said mark data field.

29. In a time clock apparatus as claimed in claim 27, and wherein electronic storage means is provided for storing identification, time and other data associated with predetermined identification marks, means responsive to the mark-sense reading of the identification marks for causing the electronic storage means to provide for said print-out alongside said appropriate card-position marker of stored data.

30. In a time clock apparatus as claimed in claim 29 and in which said identification marks comprise a train of digits preselected such that a terminal digit checks the correctness of the train, and means is provided for making a check for such correctness upon the reading of the digits.

31. In a time clock apparatus as claimed in claim 25 wherein electronic storage means is provided for storing identification, time and other data associated with predetermined identification marks, means responsive to the mark-sense reading of identification marks that do not correspond to the predetermined identification marks for causing an indication of the insertion in said receiving means of an improper time card means.

32. In a time clock apparatus as claimed in claim 29, wherein normally ineffective keyboard means is provided for enabling alterations in data in said storage means when rendered effective, said storage means being provided with means responsive to the mark-sense reading of special operator identification marks on a switching time-card means for thereupon rendering the time clock apparatus ineffective as such and for rendering said keyboard means effective to enable such alterations in data in said storage means and thereafter returning the time clock apparatus to effective operation again.

33. In a time clock apparatus as claimed in claim 29 and wherein normally ineffective keyboard means is provided for at least one of testing and modifying the time clock apparatus operation for checking and maintenance purposes and the like, said storage means being provided with means responsive to the mark-sense reading of special diagnostic identification marks on a switching time-card means for thereupon changing the operation of the time clock apparatus by rendering said keyboard means effective for such changing operation and thereafter returning the time clock apparatus to effective operation again.

34. In a time clock apparatus as claimed in claim 29 wherein normally ineffective keyboard means is provided for enabling at least one of alterations in data in said storage means and testing time clock apparatus operation when rendered ineffective, said storage means being provided with means responsive to switching means for thereupon rendering the time clock apparatus ineffective as such and for rendering the keyboard means effective to enable at least one of said alterations and testing and thereafter returning the time clock apparatus to effective operation again.

35. Time clock recording and computation apparatus and the like for use with a time and other data card provided with a clock track comprising a successively interrupted longitudinal track of black marks and a mark-sense field of successive transverse lines containing successive spaces, said apparatus having, in combination, guide means for receiving the card and permitting its entry and passage along a predetermined path; photosensitive mark-sensing means disposed along said path for reading marks upon the card, said mark-sensing means comprising clock track detector means aligned with said track and a plurality of data channel detector means for reading data along the plurality of spaces in said transverse lines of the said mark-sense field; normally ineffective printing means disposed along said path and responsive, when effective, to print data upon the card; microprocessor means having data and control lines connected with the mark-sensing and printing means and means for storing identification and other data; means responsive to the sensing by the clock track detector means of the card background and then of the clock track black marks for setting intermediate thereof the sensitivity of the mark-sense detector means; means responsive to each successive interruption in said clock track for storing in the microprocessor means the data read by the data channel detectors along the successive lines of the said mark-sense field passing the said data channel detectors; means for enabling the microprocessor means to indicate the position of the next line of spaces on the card available for printing new data on the card; and means controlled by the said enabling means for rendering the printing means effective to print the said new data on said next line.

36. Time clock recording and computation apparatus as claimed in claim 35 and in which said last-named means comprises means for grabbing the card to hold it fixed in position with said next line of spaces aligned with the printing means, and in which means is provided, following the printing, for releasing the card to permit its withdrawal through the guide means.

37. Time clock recording and computation apparatus as claimed in claim 35 and in which keyboard means is provided to initialize the time and date and to enter command functions.

38. Time clock recording and computation apparatus as claimed in claim 35 and in which indicator means is provided for indicating deviations from normal operation.

39. Time clock recording and computation apparatus as claimed in claim 35 and in which means is provided for detecting one of light transmission and reflection to enable unambiguous determination of the presence or absence of a card in the guide means.

40. Time clock recording and computation apparatus as claimed in claim 35 and in which said guide means is black and the sensitivity setting means comprises means for initially calibrating the microprocessor means to black corresponding to sensing the black guide means, means responsive to the card edge first reaching the said clock track detector means for effecting a white sensitivity state just below that needed to transition to black, means responsive to the arrival of a black track mark at said clock track detector means to effect a black sensitivity state just above that needed for transition to white, and means for causing the microprocessor means thereupon to set the detector sensitivity intermediate said black and white sensitivity states.

41. Time clock recording and computation apparatus as claimed in claim 35 and in which the reading by the data channel detectors means of the successive lines of the said mark-sense field is effected twelve times in response to successive clock track interruptions, corresponding to lines for a start code, a stop code and ten digits.

42. Time clock recording and computation apparatus as claimed in claim 35 and in which means is provided for 60-cycle interrupt handling of the microprocessor operation under conditions of normal 60-cycle interrupt for updating both time and display data, an interrupt occuring while intializing the time and date, and an interrupt during card reading for updating time data.

43. Time clock recording and computation apparatus as claimed in claim 35 and in which the clock track detector means comprises phototransistor means responsive to light reflected from the clock track marks upon the card, a constant-current source connected through a resistor network to determine current provided to the phototransistor means, and means controlled by the microprocessor means for controlling the resistance value of said resistor network correspondingly to control the sensitivity of the phototransistor means.

44. Time clock recording and computation apparatus as claimed in claim 43 and in which said resistor network is connected by data lines to the microprocessor means through latch means, operable in response to the program of the microprocessor means, to vary the effective resistance value of said network.

45. Time clock recording and computation apparatus as claimed in claim 35 and in which said data channel detector means comprise a plurality of phototransistors, each provided with bilateral switching means and a capacitor charged through the switching means by the respective phototransistors in response to said clock track interruptions, said switching means thereafter enabling the capacitors to discharge at different rates related to the light read by the respective phototransistors.

46. Time clock recording and computation apparatus as claimed in claim 45 and in which the data resulting from the discharge of said capacitors is stored in said microprocessor means.

47. Time clock recording and computation apparatus as claimed in claim 46 and in which means is provided, operable when all the said transverse lines of data are read, for enabling the microprocessor means to sort the data stored in lines into a column format, to compare the decay times of the columns to determine the two longest times, and thereupon to select one of the same as a correct start or stop mark.

48. Time clock recording and computation apparatus as claimed in claim 47 and in which the apparatus operates in accordance with the program tabulated in the specification hereof as Time Clock Program Control Logic with the Tabulated Mark Sense Card Read and Processing Routines, and Card Removal Subroutine.

49. Time clock recording and computation apparatus as claimed in claim 35 and in which said clock track marks are disposed along a longitudinal edge of the card.

50. Time clock recording and computation apparatus as claimed in claim 35 and in which said clock track marks are disposed longitudinally centrally of the card.

51. For use in time clock recording and computation apparatus and the like employing a data card provided with a clock track comprising a successively interrupted longitudinal track of black marks and a mark-sense field of spaces for data, mark-sense apparatus having, in combination, guide means for receiving the card and permitting its entry and passage along a predetermined path; photosensitive mark-sensing means disposed along said path for reading marks upon the card, said mark-sensing means comprising clock track detector means aligned with said track and data channel detector means for reading data along the said mark-sense field, and means responsive to the sensing by the clock track black marks for setting intermediate thereof the sensitivity of the mark-sense detector means.

52. Mark-sense apparatus as claimed in claim 51 and in which said guide means is black, and the sensitivity setting means comprises microprocessor means having means for initially calibrating the microprocessor means to black corresponding to sensing the black guide means, means responsive to the card edge first reaching the said clock track detector means for effecting a white sensitivity state just below that needed to transition to black, means responsive to the arrival of a black-track mark at said clock track detector means to effect a black sensitivity state just above that needed for transition to white, and means for causing the microprocessor means thereupon to set the detector sensitivity intermediate between said black and white sensitivity states.

53. Mark-sense apparatus as claimed in claim 52 and in which the clock track detector means comprises phototransistor means responsive to light reflected from the clock track means upon the card, a constant-current source connected through a resistor network to determine current provided to the phototransistor means, and means controlled by the microprocessor means for controlling the resistance value of said resistor network correspondingly to control the sensitivity of the phototransistor means.

54. Mark-sense apparatus as claimed in claim 53 and in which said resistor network is connected by data lines to the microprocessor means through latch means, operable in response to the program of the microprocessor means, to vary the effective resistance value of said network.

55. Mark-sense apparatus as claimed in claim 51 and in which said data channel detector means comprises a plurality of photosensitive detectors responsive to successive clock track means for reading successive lines of said mark-sense field.

56. Mark-sense apparatus as claimed in claim 55 and in which said data channel photosensitive detectors comprise a plurality of phototransistors, each provided with bilateral switching means and a capacitor charged through the switching means by the respective phototransistor in response to said clock track interruptions, said switching means thereafter enabling the capacitors to discharge at different rates related to the light read by the respective phototransistors.

* * * * *